United States Patent [19]

Hara et al.

[11] Patent Number: 5,758,205

[45] Date of Patent: May 26, 1998

[54] LENS BARREL

[75] Inventors: Minoru Hara, Hachioji; Kazuhiro Satoh, Sagamihara; Eiji Otsuka, Minowa-machi, all of Japan

[73] Assignee: Olympus Optical Co., Ltd., Tokyo, Japan

[21] Appl. No.: 677,500

[22] Filed: Jul. 10, 1996

Related U.S. Application Data

[63] Continuation of Ser. No. 222,332, Apr. 4, 1994, Pat. No. 5,583,595.

[30] Foreign Application Priority Data

Jan. 7, 1992 [JP] Japan .................... H4-001030
Nov. 4, 1992 [JP] Japan .................... H4-295140

[51] Int. Cl.$^6$ ........................................ G03B 17/00
[52] U.S. Cl. ................. 396/79; 396/85; 396/133; 396/134
[58] Field of Search ........................ 396/79, 85, 133, 396/134

[56] References Cited

U.S. PATENT DOCUMENTS

| | | | |
|---|---|---|---|
| 4,380,378 | 4/1983 | Tamura | 350/429 |
| 4,386,829 | 6/1983 | Sumi | 350/429 |
| 4,465,344 | 8/1984 | Sumi | 350/429 |
| 4,484,800 | 11/1984 | Tamura | 350/429 |
| 4,537,487 | 8/1985 | Taniguchi et al. | 354/400 |
| 4,707,083 | 11/1987 | Iizuka et al. | 350/429 |
| 4,767,200 | 8/1988 | Inaba et al. | 350/429 |
| 5,037,187 | 8/1991 | Oda et al. | 354/195.12 |
| 5,077,571 | 12/1991 | Takayama et al. | 354/400 |
| 5,216,549 | 6/1993 | Notagashira et al. | 359/703 |
| 5,583,595 | 12/1996 | Hara et al. | 396/79 |

*Primary Examiner*—Russell E. Adams
*Attorney, Agent, or Firm*—Louis Weinstein

[57] ABSTRACT

A lens barrel constructed of a cam slot, a lens cylinder, a memory means, a detecting means, a motor driving means and a control means. The cam slot has a discontinuous area formed in a portion corresponding to a parting line of a molding die used for molding. The lens cylinder ass a cam follower engaging with this cam slot. The memory means stores information indicating where the discontinuous area exists in the cam slot. The detecting means detects where the cam follower is positioned in the cam slot. The motor driving means makes the lens cylinder progress and retreat in the optical-axis direction by relatively driving the cam slot and the lens cylinder. The control means controls the motor driving means to drive the lens cylinder up to a position deviating from the discontinuous area when the cam follower is in the discontinuous area by comparing memory information of the memory mens with detection information of the detecting means.

46 Claims, 22 Drawing Sheets

COLLAPSE W          T

LENS BARREL

This is a Continuation of application Ser. No. 08/222,332, filed Apr. 4, 1994, now U.S. Pat. No. 5,583,595.

BACKGROUND OF THE INVENTION

1. Field of the Invention

The present invention relates generally to a lens barrel and, more particularly, to a lens barrel constructed to progress and retreat a lens housing such as a lens cylinder of a camera through cam grooves.

2. Related Background Art

A variety of constructions have hitherto been adopted as configurations of a lens driving cam groove holed in, e.g., a lens cylinder. Various constructions have been proposed for the cam groove formed by so-called mold forming especially in the lens cylinder manufactured from a plastic material.

Generally, a lens driving oblique cam groove holed in the molded cylinder is forced to undergo many constraints in terms of structure of a molding die thereof. For this reason, the following construction has been proposed. This cam groove is formed as a bottomed cam groove in the inner peripheral surface of the cylinder. At the same time, a sectional configuration of the cam groove is designed to be a trapezoid, thereby facilitating a removal of the die. In the bottomed cam groove assuming the trapezoid, a backlash is easy to occur with respect to a cam follower. A biasing member for thrusting the cam follower against the cam groove is required for obviating the backlash.

Further, a cam groove assuming a shape other than the trapezoid in section by partitioning the molding die is also manufactured into a product. For manufacturing this type of cam groove, a parting line for die matching is needed in the cam groove. However, a pressure of the plastic material injected during mold forming is applied on this parting line. The plastic material permeates in the flash line between the mutual dies. So-called burrs are thereby produced.

Then, if the burrs are produced, the action of the cam follower fitted in the cam groove is hindered due to the burrs. Runs-offs 10B, as illustrated in FIG. 8, are formed for removing the burrs during the molding process. The parting line is partially retracted from a cam groove 10A so that the burrs are intruded inwardly of the wall surface of the cam groove 10A. The run-offs are thus formed.

In the lens barrel including the cam groove 10A described above, however, the backlash is caused in the run-offs 10B provided in the cam groove 10A. An optical performance of the lens barrel is thereby deteriorated. Besides, whereas if the run-offs 10B are not formed, as explained above, the action of the cam follower fitted in the cam groove 10A is hindered by the burrs protruding from the wall surface of the cam groove 10A. The operation becomes unstable.

SUMMARY OF THE INVENTION

It is a primary object of the present invention to provide a lens barrel capable of finely eliminating such a problem that a discontinuous part is formed in a cam groove and causes a decline in precision of the cam groove, the problem being conceived as a defect inherent in a conventional device wherein a cam groove is formed by splitting a die into a plurality of segments.

It is another object of the present invention to provide a lens barrel constructed to control a motor driving means so that a cam follower shifts to a position deviating from a discontinuous area in a cam groove in accordance with an output of detection by detecting a position of the cam follower in the cam groove.

Explaining briefly, according to one aspect of the present invention, there is provided a lens barrel comprising: a cam slot having a discontinuous area; a frame member having a cam follower engaging the cam slot; a memory means for storing information indicating where the discontinuous area exists in the cam slot; a detecting means for detecting where the cam follower is positioned in the cam follower; a motor driving means for progressing and retreating a frame member in the optical-axis direction by driving the cam slot relative to the frame member; and a control means for controlling the motor driving means so that the cam follower shifts to a position deviating from the discontinuous area when the cam follower is in the discontinuous area by comparing memory information of the memory means with detection information of the detecting means.

These and other objects and advantages of the present invention will be come apparent from the following detailed description.

According to the present invention, there are obtained remarkable effects in which the cam groove assuming a rectangular shape in section can be manufactured by mold forming; and further the biasing member for eliminating the backlash becomes unnecessary.

DETAILED DESCRIPTION OF THE PREFERRED EMBODIMENTS

Figure 1:
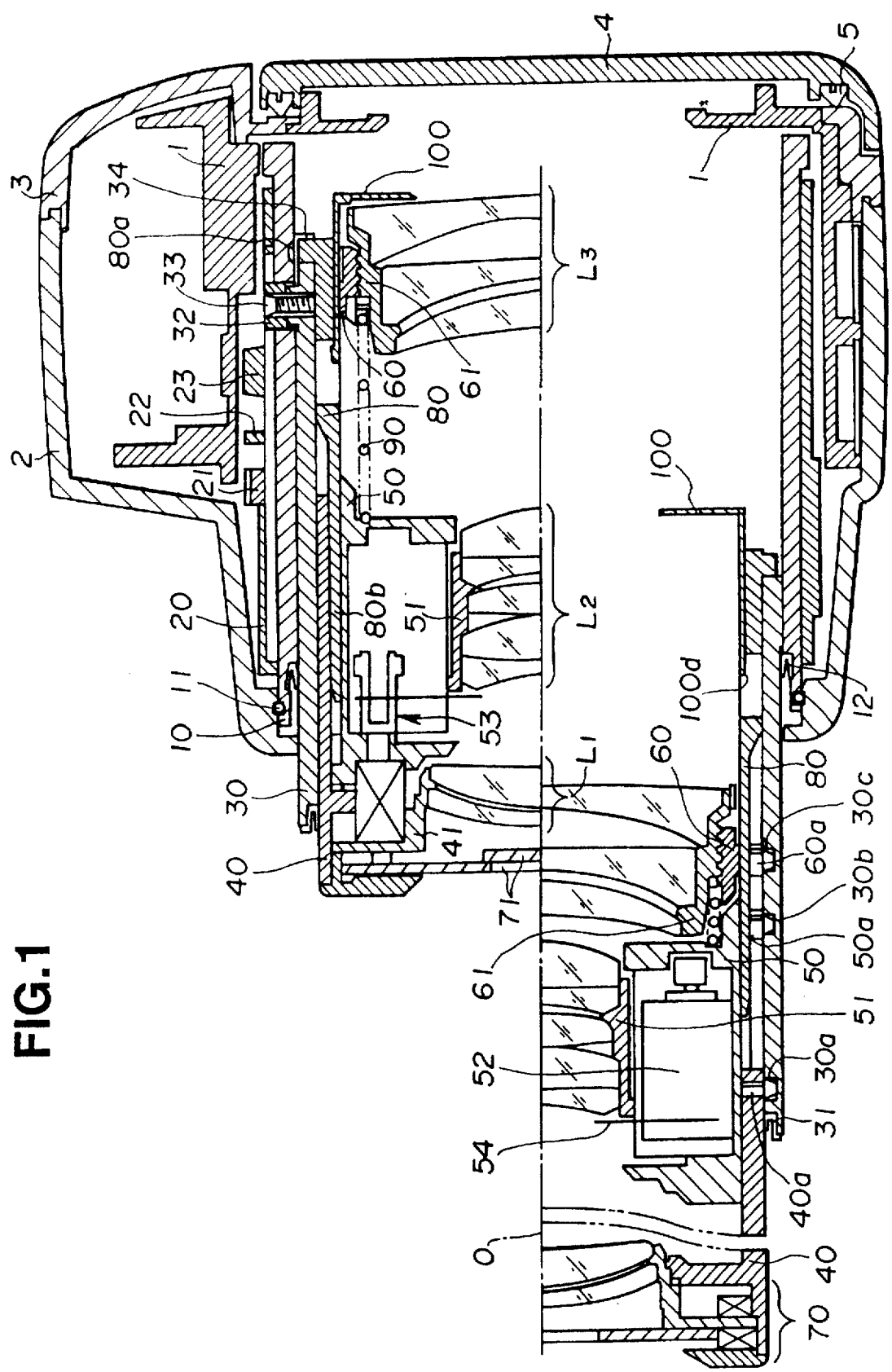
FIG. 1 is a sectional view of a lens barrel, showing a first embodiment of the present invention.
Figure 2:
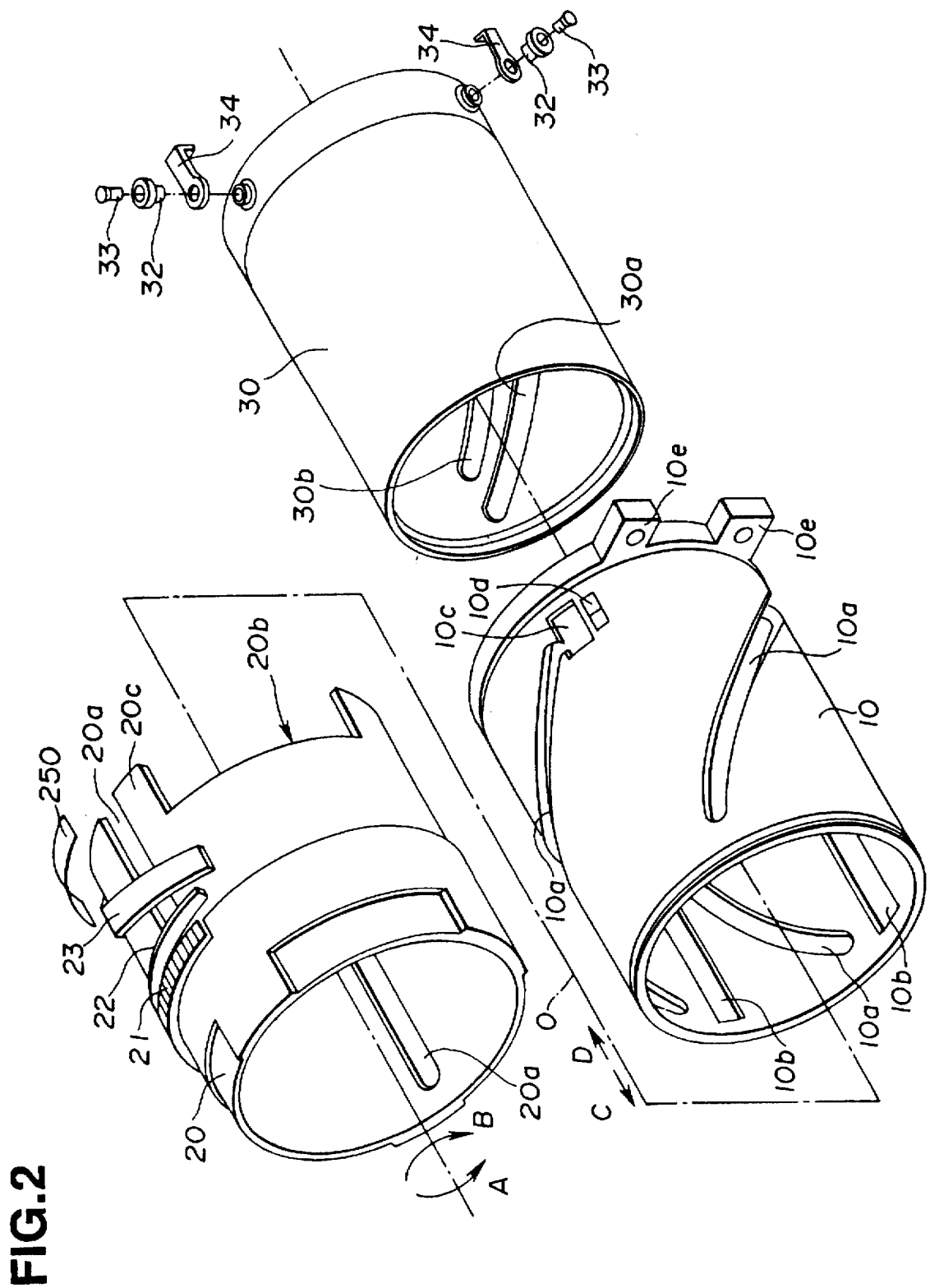
FIG. 2 is an exploded perspective view illustrating a front constructive member of the lens barrel, wherein the front constructive member is extended in the optical-axis direction.
Figure 3:
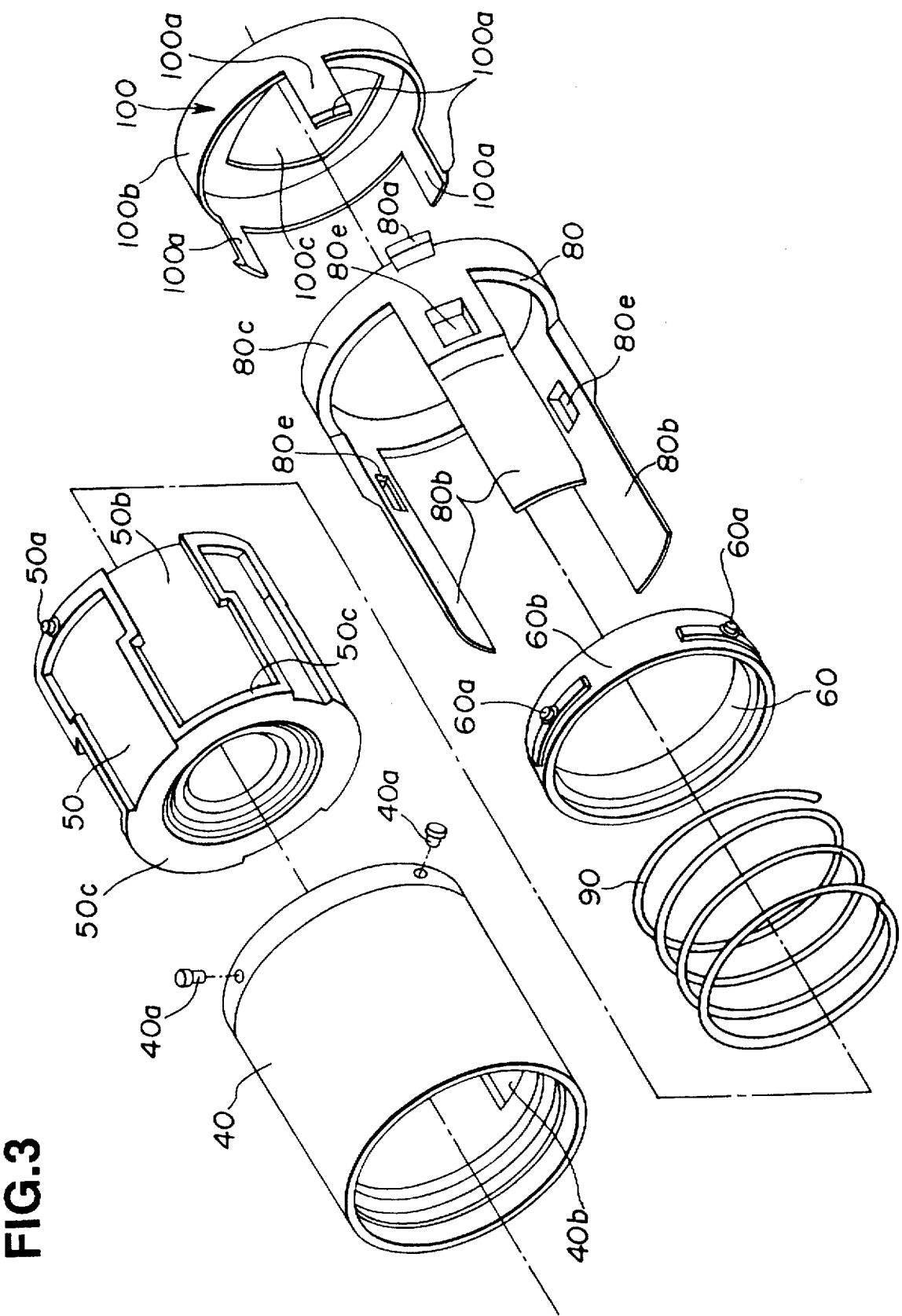
FIG. 3 is an exploded perspective view showing a rear constructive member of the lens barrel, wherein the rear constructive member is extended in the optical-axis direction.

FIG. 1 is a sectional view of the principal portion of a camera including a lens barrel, showing a first embodiment of the present invention. FIGS. 2 and 3 are exploded perspective views illustrating respective members constituting the lens barrel, wherein these members are extended in the direction of the optical axis.

In accordance with this embodiment, the present invention is applied to a zoom lens barrel. This zoom lens barrel is constructed to include a fixed cylinder 10 integrally attached to a camera body 1. An upper half section in FIG. 1 illustrates a state where a zoom lens is shifted to a wide-angle position. A lower half section thereof shows a state where the zoom lens is shifted to a telephoto position.

The camera incorporating this lens barrel is constructed mainly of a front cover 2 for covering the front section of the camera body 1, a rear cover 3 for covering the rear section thereof and a back cover 4. Incidentally, the back cover 4 is so fitted to the rear cover 3 as to be openable and closeable through a hinge (unillustrated). This back cover 4 is also photo-tightly closed by a light shielding elastic member 5.

The zoom lens barrel comprises a driving cylinder 20, a cam cylinder 30, a first lens cylinder 40, a second lens cylinder 50, a third lens cylinder 60, a float key 80, a barrier unit 70 (see FIG. 1), sectors 54 (see FIG. 1), an elastic member 90 and a flare stop 100. The driving cylinder 20 is rotatably fitted to an outer peripheral surface of the fixed cylinder 10 to hinder a shift thereof in the optical-axis direction. The cam cylinder 30 fitted to an inner peripheral surface of the fixed cylinder 10 is driven by the driving cylinder 20 and moves back and forth in the optical axis direction while rotating. The first through third lens cylinders 40, 50 and 60 each move to and fro in the optical-axis direction. The float key 80 is similarly disposed within the cam cylinder 30 to hinder a shift thereof in the optical-axis direction by a key receiving member 34. At the same time, a rotation of the float key 80 about the optical axis is hindered by the fixed cylinder 10. The float key 80 regulates rotations of the first through third lens cylinders 40, 50 and 60 about the optical axis. The barrier unit 70 disposed in front of the first lens cylinder 40 includes a barrier 71 opened and closed by a barrier driver 53 supported within the second lens cylinder 50. The sectors 54 are opened and closed by a shutter unit 52 (see FIG. 1) supported inwardly of the second lens cylinder 50. The elastic member 90 is stretched between the second lens cylinder 50 and the third lens cylinder 60. The elastic member 90 consists of a coil spring for absorbing backlashes in engagements of driving rollers 50a and 60a with cam slots 30b and 30c which will be mentioned later. The flare stop 100 is mounted on the rear portion of the float key 80.

A driving gear 21 formed in a configuration of a segmentary circular arc, a guide rib 22 and an interlocking cam 23 are disposed sequentially rearwardly from a forward position on the outer peripheral surface of the driving cylinder 20. The driving gear 21, upon receiving a driving force from an unillustrated zoom driving unit, causes the driving cylinder 20 to rotate counterclockwise A or clockwise B about the optical axis O while being guided by the guide rib 22 (see FIG. 2). Further, the interlocking cam 23 serves for zooming by a lens of an unillustrated view finder optical system. Then, this driving cylinder 20 is formed with guide elongate slots 20a in trisected positions in its periphery in a longitudinal direction. In addition, the rear edge of the driving cylinder 20 is formed with a notch for admitting a passage of a date photoing luminous flux from a data unit 150 (see FIG. 4) which will hereinafter be stated. Further, the rear edge of this driving cylinder 20 is also provided with an encoder 250 for detecting a rotational quantity of the driving cylinder 20.

Figure 4:
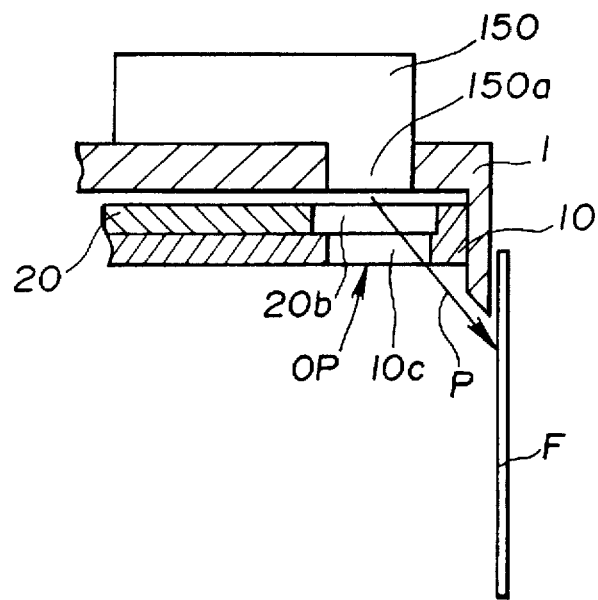
FIG. 4 is an enlarged principal sectional view showing a data unit and a data photoing luminous flux P.
Figure 5:
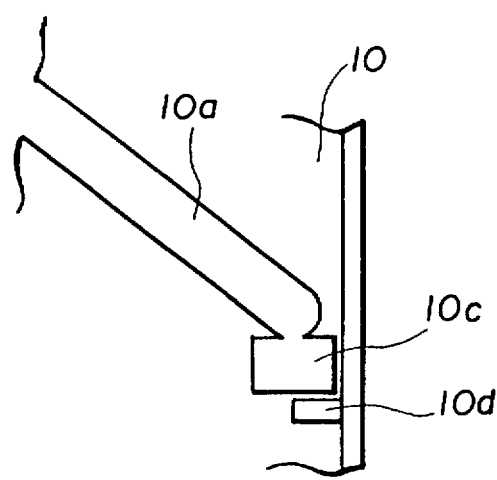
FIG. 5 is a principal plan view illustrating a data photoing through-hole formed in a fixed cylinder.

The fixed cylinder 10 includes lead-like cam slots 10a for moving the cam cylinder 30 back and forth in the optical-axis direction while rotating the cam cylinder. The cam slots 10a are holed in trisected positions of the peripheral surface thereof. At the same time, the linear grooves 10b are formed in trisected positions in the peripheral direction of the inner peripheral surface. Guide protrusions 80a of the float key 80 which will be mentioned later are fitted into the linear grooves 10b. Then, as illustrated in FIGS. 2 and 5, the rear end of this fixed cylinder 10 that faces the film surface is formed with a rectangular through-hole 10c that is long in the optical-axis direction. The through-hole 10c is contiguous to the terminal of the cam slot 10a positioned in the upper part of the camera among the cam slots 10a described above. The through-hole 10c is formed so that the notch 20b of the driving cylinder 20 is overlapped with this through-hole during photographing. The through-hole 10c serves to admit a passage of the date photoing luminous flux from the data unit 150 (see FIG. 4) defined as a data photoing means towards the film surface. Further, a stopping protrusion 10d for regulating a rotation of the driving cylinder 20 is formed on the outer peripheral surface on the side opposite to the terminal of the cam slot 10a described above, with this through-hole 10c being middled therebetween. Note that a protruded member 10e protruding in the radial direction is formed sat the rear edge of the fixed cylinder 10. The protruded member 10e is conceived as a fitting part to the camera body 1.

Referring back to FIGS. 1, 2 and 3, the cam cylinder 30 is fitted to the inner peripheral surface of this fixed cylinder 10. The cam cylinder 30 has cam grooves 30a, each formed in trisected positions of the inner peripheral surface thereof, for making a zooming movement of the first lens cylinder 40 in the optical-axis direction. Similarly, cam grooves 30b for making the zooming movement of the second lens cylinder 50 in the optical-axis direction are also formed in trisected positions of the inner peripheral surface thereof. Cam grooves 30c for making the zooming movement of the third lens cylinder 60 in the optical-axis direction are formed in trisected positions of the inner peripheral surface thereof. Then, zoom driving rollers 32 are fixed with machine screws 33 in trisected positions of the outer peripheral surface of the rear edge portion. The rollers 32 penetrate the cam slots 10a of the fixed cylinder 10 and are fitted into the guide elongate slots 20a of the driving cylinder 20. Hence, when the driving cylinder 20 rotates about the optical axis O, the zoom driving rollers 32 also rotate while being guided along the guide elongate slots 20a. The cam cylinder 30 therefore moves to and fro in the optical-axis direction while rotating with the aid of the cam slots 10a.

A lens support frame 41 for holding a first lens group L1 (see FIG. 1) is fixed closer to the front in the interior of the first lens cylinder 40. The first lens cylinder 40 also includes guide grooves 40b having a relatively large width and formed in trisected positions of the inner peripheral surface thereof. Outer surfaces of key parts 80b of the float key 80 which will be mentioned later are fitted in the guide grooves 40b. The first lens cylinder 40 is thereby regulated to move only in the optical-axis direction. Further, driving rollers 40a are fixedly embedded in trisected positions of the outer peripheral surface of the rear end portion of the lens cylinder 40. The driving rollers 40a are fitted in the cam grooves 30a of the cam cylinder 30.

A lens support frame 51 for holding a second lens group L2 (see FIG. 1) is fixed inwardly of the second lens cylinder 50. The second lens cylinder 50 includes guide recesses 50b formed in trisected positions of the outer peripheral surface thereof and having a relatively large width in the peripheral direction. The guide recesses 50b open at their rear parts and extending in the optical-axis direction have front end walls 50c. The inner surfaces of the key parts 80b of the float key 80 that are set in the guide grooves 40b are fitted in the guide recesses 50b. The lens cylinder 50 is thereby regulated to move only in the optical-axis direction. Hence, the key parts 80b of the float key 80 are sandwiched between the guide grooves 40b and the guide recesses 50b. Further, driving rollers 50a are fixedly embedded in the rear part between the guide recesses 50b on the outer peripheral surface. These driving rollers 50a are therefore each embedded in trisected positions of the outer peripheral surface of the rear end portion of the lens cylinder 50. The driving rollers 50a are fitted respectively in the cam grooves 30b of the cam cylinder 30. Note that the second lens cylinder 50 is, as explained above, provided with the shutter unit 52 and the sectors 54 so that these components move back and forth together with the second lens cylinder 50.

A lens support frame 61 for holding a third lens group (see FIG. 1) is fixed in the interior of the third lens cylinder 60. At the same time, the third lens cylinder 60 includes guide notches 60b having a relatively large width. The guide notches 60b extending in the circumferential direction are formed in trisected positions of the outer peripheral surface thereof. Fitted in the guide notches 60b are the key parts 80b of the float key 80 that are interposed between the guide grooves 40b and the guide recesses 50b. The third lens cylinder 60 is thereby regulated to move only in the optical-axis direction. Further, driving rollers 60a are fixedly embedded between the guide notches 60b in the outer peripheral surface of this lens cylinder 60. The driving rollers 60a are thus fixedly embedded in trisected positions of the outer peripheral surface of the lens cylinder 60. The driving rollers 60a are each fitted in the cam grooves 30c of the cam cylinder 30.

Then, the elastic member 90 is stretched between the front end surface of the third lens cylinder 60 and the rear end surface of the second lens cylinder 50. The elastic member 90 is composed of a coil spring for absorbing backlashes in engagements of the driving rollers 50a with the cam slots 30b and of the driving rollers 60a with the cam slots 30c.

Further, the float key 80 is constructed of an annular proximal part 80c, the three key parts 80b, rectangular fitting holes 80e and guide protrusions 80a. The proximal part 80c has its front portion located along the inner periphery of the rear end part of the cam cylinder 30. The key parts 80b extend forwards from the trisected positions of the front surface thereof. The fitting holes 80e elongated in the optical-axis direction are each formed closer to the annular proximal part 80c of the key parts 80b. The guide protrusions 80a protrude in trisected positions of the outer peripheral surface of the annular proximal part 80c. The protrusions 80b are fitted in the linear guide grooves 10b of the fixed cylinder 10. When fixing the zoom driving rollers 32 with the machine screws 33 in the trisected positions of the outer peripheral surface of the rear end portion of the cam cylinder 30, the rear end surface of the annular proximal part 80c is received by the key receiving member 34 simultaneously fixed with the machine screws 33. This float key 80 is, though it moves in the optical-axis direction together with the cam cylinder 30, thereby hindered from rotating about the optical axis O by the guide protrusions 80a being fitted in the linear guide grooves 10b of the fixed cylinder 10. Then, the three key parts 80b extending forwards are inserted into the guide notches 60b of the third lens cylinder 60, the guide recesses 50b of the second lens cylinder 50 and the guide grooves 40b of the first lens cylinder 40.

The flare stop 100 is constructed of an annular peripheral wall part 100b, fitting members 100a and detents 100d. The peripheral wall part 100b is formed forward along the outer periphery of a thin disc bored with a flare stop aperture 100c at its central portion. The fitting members 100a each exhibiting an elasticity extend forwards from trisected positions of the front surface of the annular peripheral part 100b. The detents 100d are formed on the outer peripheral surfaces of the tips of the fitting members 100a. The flare stop 100 is fitted from backward into the inner peripheral surface of the float key 80 so as not to interfere with the third lens cylinder 60. The detents 100d of the fitting members 100a resiliently fitted in the rectangular fitting holes 80e of the float key 80. The flare stop 100 is thereby attached to the float key 80 so as to be movable by a length of the fitting hole 80e in the optical-axis direction.

Note that, as shown in FIG. 1, an O-ring 11 for keeping photo-tightness and liquid-tightness is provided between the inner peripheral surface of the front end portion of the front cover 2 and the outer peripheral surface of the front end portion of the fixed cylinder 10. Elastic rings 12, 31 for keeping the photo-tightness and liquid-tightness are also provided respectively between the inner peripheral surface, closer to the front end portion, of the fixed cylinder 10 and the outer peripheral surface of the cam cylinder 30 and between the front end surface of the cam cylinder 30 and the outer peripheral surface of the first lens cylinder 40.

Then, the data unit 150 acts to photo the data from forward on the film surface. The data unit 150 is, as illustrated in FIG. 4, fixed on the camera body 1 in a space between the front and rear covers 3, 4 and the camera body 1. In a normal photographing state, a date photoing luminous flux P emitted from a light emitting part 150a thereof reaches the front surface of the film F via an aperture OP. The aperture OP is formed when the notch 20b of the driving cylinder 20 overlaps and aligns with the through-hole 10c of the fixed cylinder 10.

Figure 6:
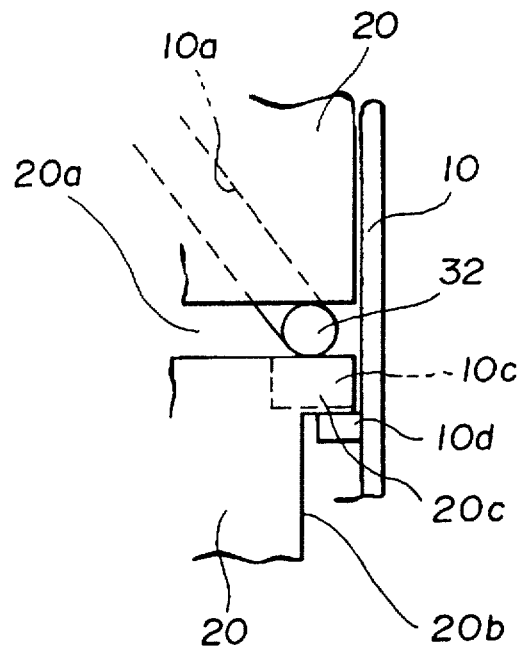
FIG. 6 is a principal plan view showing a state where the data photoing through-hole is closed by a light shielding member of a driving cylinder.

The following is an explanation of the actions of the data unit 150 as well as of the zoom lens barrel that are constructed in the above-mentioned manner. To start with, the barrel moves further backwards from the wide-angle position of the zoom lens barrel shown in the upper half section of FIG. 1. In a collapsing position where the lens barrel approaches the aperture window of the camera body 1, the driving cylinder 20 rotates clockwise as shown by arrow B (see FIG. 2) about the optical axis O and is positioned at the terminal. Therefore, as illustrated in FIG. 6, one inner side edge of the notch 20b impinges on the stop protrusion 10d of the fixed cylinder 10. The through-hole 10c of the fixed cylinder 10 is covered with a light shielding member 20c formed between the notch 20b and the guide elongate slot 20a. Hence, in this collapsing position, the notch 20b of the driving cylinder 20 is not overlapped and aligned with the through-hole 10c of the fixed cylinder 10, but the aperture OP (see FIG. 4) is closed. Consequently, even if the light emitting part 150a of the data unit 150 (see FIG. 4) defined as a data photoing means emits light mistakenly, the data photoing luminous flux P thereof does not reach the front surface of the film F. Further, the light shielding member 20c covers the through-hole 10c of the fixed cylinder 10. The surface of the film F is thereby prevented to the greatest possible degree from being exposed to the external light passing through the through-hole 10c.

Figure 7:
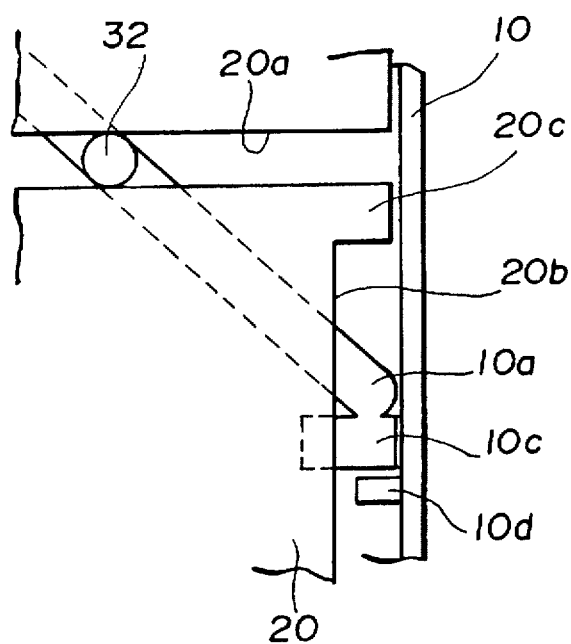
FIG. 7 is a principal plan view showing a state where a notch of the driving cylinder coincides with the data photoing through-hole of the fixed cylinder, and the same through-hole is opened.

Subsequently, the driving cylinder 20, upon undergoing a drive of the unillustrated zoom driving unit, rotates counterclockwise as shown by arrow A about the optical axis O. Then, the zoom driving rollers 32 fitting in the guide elongate slots 20a also rotate in the counterclockwise direction A. The cam cylinder 30 is therefore guided along the cam slots 10a of the fixed cylinder 10 and progresses in the optical-axis direction while being rotated. At this moment, the float key 80 moves only in the optical-axis direction. Then, with the actions of this cam cylinder 30 and the float key 80, the first to third lens cylinders 40, 50, 60 move in the optical-axis direction to obtain a predetermined focal distance while they are each guided along the cam grooves 30a, 30b, 30c. Thus, the lens barrel comes to the wide-angle position from the collapsing position shown in the upper half section of FIG. 1. When in this wide-angle position, at least the third lens cylinder 60, as shown in FIG. 1, moves by a predetermined distance towards a subject from the film surface. The light shielding member 20c of the driving cylinder 20, as depicted in FIG. 7, moves in the peripheral direction from above the through-hole 10c of the fixed cylinder 10. Accordingly, the through-hole 10c and the notch 20b overlap with each other, thereby forming the aperture OP. The data photoing luminous flux P is allowed to reach the front surface of the film F. When the light emitting part 150a of the data unit 150 emits the light, desired date information can be photoed on the film surface.

This data photoing state is held till the zoom lens barrel shifts to the telephoto state shown in the lower half section of FIG. 1 after the driving cylinder has further rotated in the counterclockwise direction A. It is therefore possible to photo the data during photographing.

Next, when the driving cylinder 20 is rotated in the clockwise direction B about the optical axis by means of the zoom driving unit, each lens cylinder is moved reversely to the rotation in the counterclockwise direction A. Eventually, each lens group is moved to the collapsing position. Hence, in this collapsing position, as explained before, the light shielding member 20c covers the through-hole 10c of the fixed cylinder 10. The surface of the film F can not be therefore exposed to the date photoing luminous flux P and the external light that have passed through the through-hole 10c.

Figure 12:
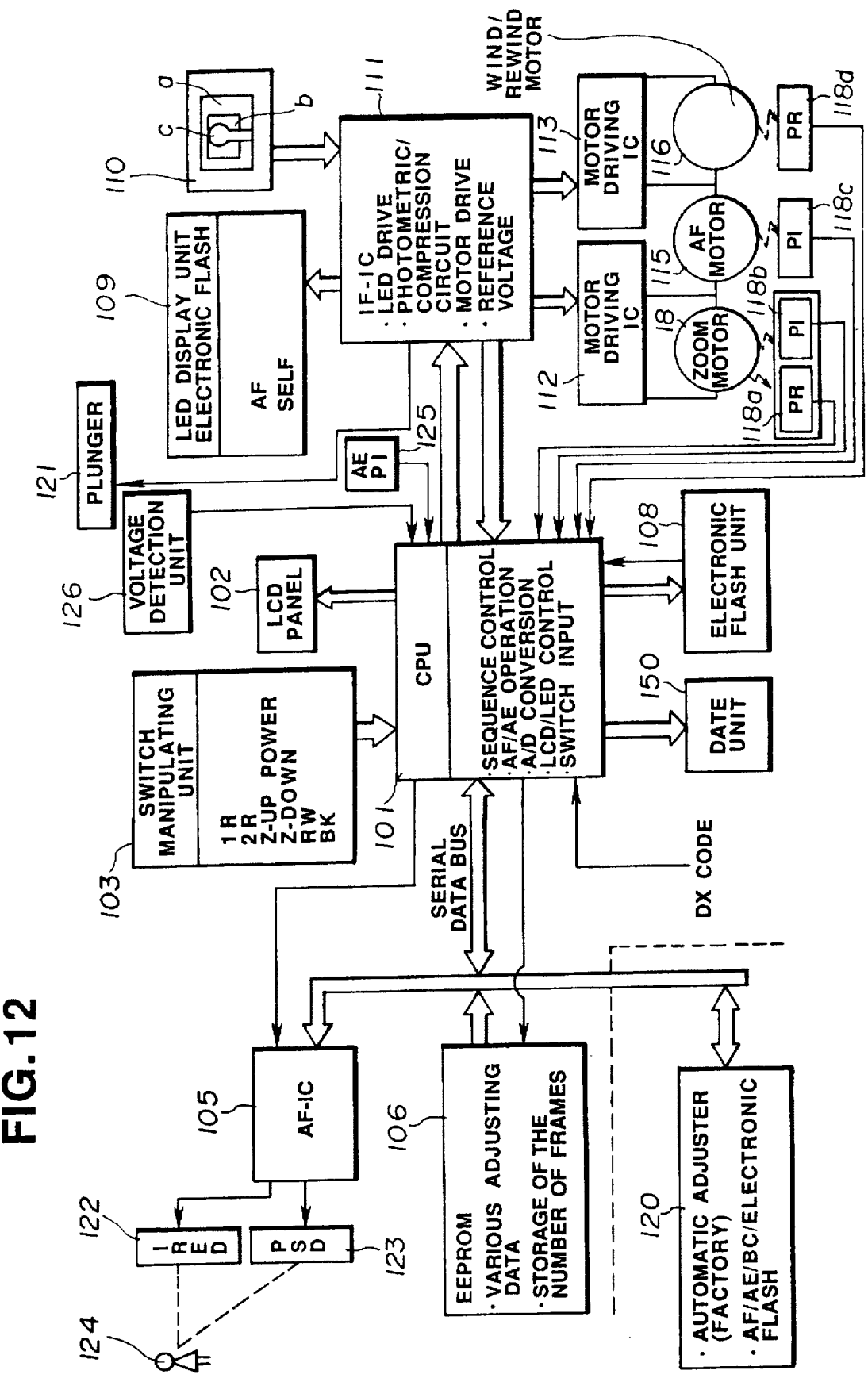
FIG. 12 is a block diagram illustrating a zoom camera incorporating a lens barrel according to the present invention.

FIG. 12 is a block diagram of a zoom camera incorporating the lens barrel to which the present invention is applied. The CPU 101 controls a sequence of the camera operations, an AF/AE operation, an A/D conversion, LCD/LED control and switch inputting with the aid of a microcomputer for controlling the operations of the whole camera.

An LCD panel 102 is a liquid crystal display panel for displaying the number of film frames, an electronic flash mode, a photographing mode, a result of battery check.

"1R" in a switch manipulation unit 103 represents an AF/AE lock switch to be made when a release button is half-depressed. A shutter release switch 2R is made when the release button is full-depressed. A symbol "Z-UP" denotes a zoom-up switch, and "Z-DOWN" designates a zoom-down switch. Further, a power switch POWER, when turned ON, brings the whole camera into a photographable state through an indication on LCD. A switch RW for forcibly rewinding the film effects rewinding during photographing. A switch BK for opening and closing the back cover conducts free winding upon detecting that the back cover has been closed by the back cover opening/closing switch.

The numeral 105 represents a focusing AF-IC; 122 a light emitting diode (IRED); 123 a position sensor (position sensitive device PSD); and 124 a subject. Based on a control signal transmitted from the CPU 101, the AF-IC 105 projects an infrared ray towards the subject 124. Reflected light thereof is detected by the position sensor 123, whereby focusing is effected. Then, focusing data thus obtained is transmitted via a serial data bus to the CPU 101.

An EEPROM 106, which is an electrically erasable programmable ROM, constitutes a memory means in the present invention. The EEPROM 106 stores a large variety of adjusting values of the number of film frames, exposure compensating information, electronic flash charge voltage information and battery check information. The EEPROM 106 also stores data indicating where a discontinuous area exists in the cam groove.

Further, the date unit 150 performs photoing of a date. An electronic flash unit 108 starts charging when a charge signal is given from the CPU 101. A charge voltage is transmitted to the CPU 101 and undergoes an A/D conversion. Thereafter, the charge voltage is compared with charge voltage information of the EEPROM 106. Whether charging is completed or not is checked. An LED display unit 109 conducts self-timer display in addition to informing the photographer of an electronic flashing alarm and an AF lock.

An interface IC 111 is a circuit for effecting a photometric process with the aid of a split type SPD (silicon photo diode) 110. The IC 111 includes a motor drive circuit and a reference voltage circuit. In the split type SPD 110 conceived as a 3-split SPD, spot metering is conducted in a central diode SPDc. Performed respectively by two peripheral diodes SPDa, SPDb is averaged overall light reading on the side of a shorter focal distance (wide-angle) in the zoom camera. Further, when set on the telephoto side where the focal distance is relatively long by zooming, the photometric process is carried out in a (b+c) area. When a difference between a value of spot metering effected in this central diode SPDc and a value of averaged overall light reading conducted in the peripheral diodes SPDa, SPDb reaches a certain fixed value, this is judged as back flashlight. The light is automatically emitted by the electronic flash 108.

Note that the numerals 112, 113 designate motor driving ICs. Motor driving signals transmitted from the CPU 101 are decoded once in the IF-IC 111 and thereafter supplied to the motor driving ICs 112, 113. Then, any of a zoom motor 18, an AF motor 115 and a film winding/rewinding motor 116 is selected by a signal of the CPU 101. This motor is then driven. A photo interrupter (hereafter abbreviated to PI) 118c is added to the AF motor 115. A photo reflector (hereafter abbreviated to PR) 118d is added to the film winding/rewinding motor 116. Then, the CPU 101 controls the motors 115, 116 while reading signals of the PI 118c and PR118d. The zoom motor 18 is provided with a zoom encoder in combination with PI 118b and PR 118a. The action thereof will be explained later.

Further, an automatic adjuster 120 is employed as a checker for checking AF, AE and a battery and also adjusting the electronic flash in the factory. Each data is transmitted via the serial data bus to the CPU 101. Adjusting values are stored in the EEPROM 106. DX codes of the film are read directly to the CPU 101. The DX information is used as arithmetic values for determining an exposure value. When turning ON a plunger 121 for opening and closing the sectors, a part of the sectors which shield an AEPI 125 from the light move. A signal is then transmitted from the PI. The CPU 101 recognizes this signal as a start of exposure. After an arithmetically obtained shutter open time has elapsed, the plunger 121 is turned OFF. A detection unit 126 for a battery voltage resets the CPU 101 in the case of switching ON the battery and returning a failed voltage.

Figure 13:
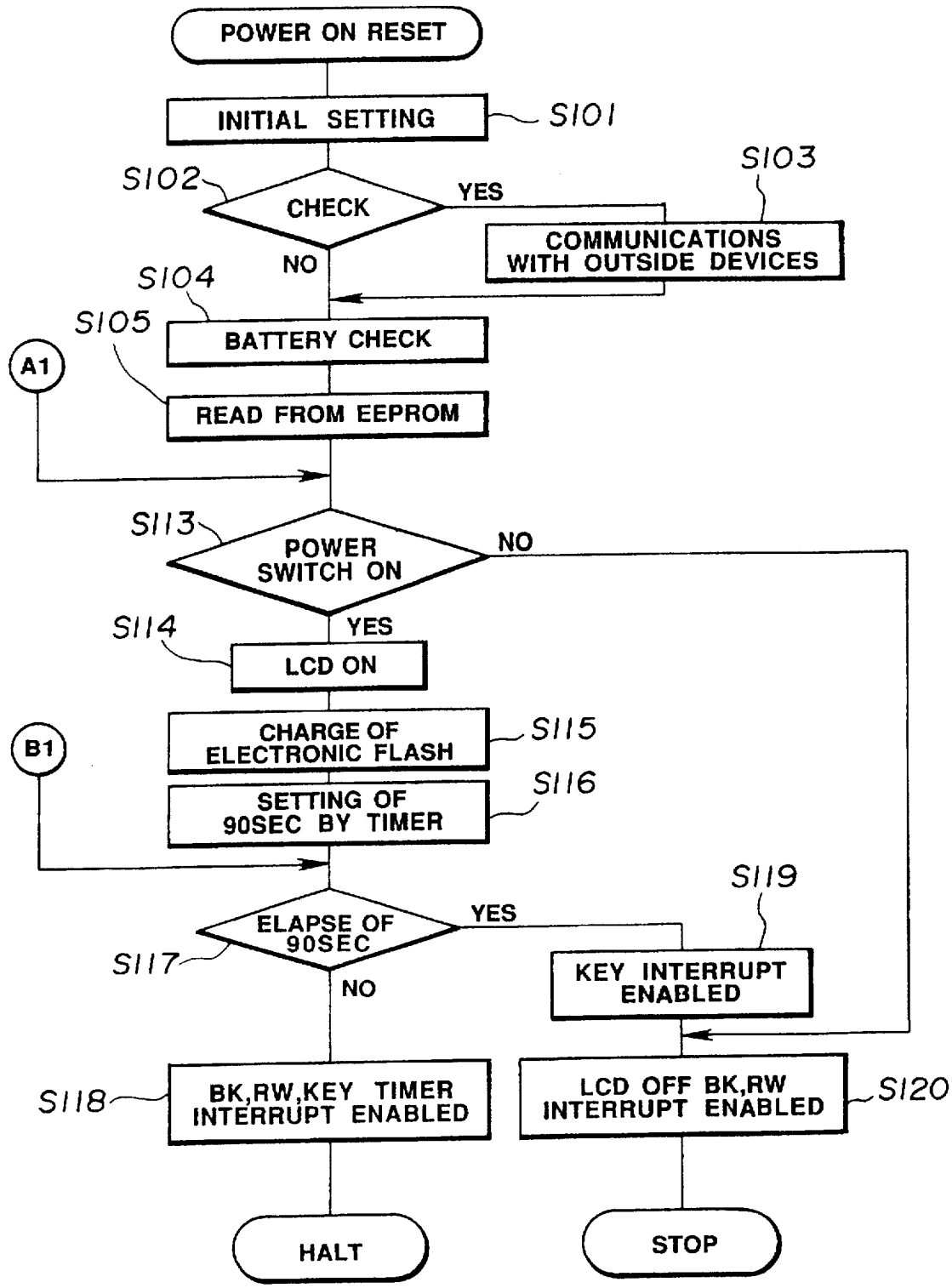
FIG. 13 is a flowchart of a subroutine of "POWER ON RESET" of the zoom camera.

FIG. 13 is a flowchart of a subroutine of "POWER ON RESET" when switching ON the power source of the zoom lens camera. Referring to FIG. 13, the battery is set, or a power switch is changed over. Hereupon, "POWER ON RESET" is applied to the CPU 101, thereby starting the operation of the camera. When accessing the subroutine of "POWER ON RESET", "INITIAL SET" of each port and a RAM is at first executed in step S101. A judgement of "CHECK" is carried out in step S102. As a result of "CHECK", when the automatic adjuster 120 is connected to the CPU 101, the action proceeds to step S103 wherein "COMMUNICATIONS WITH OUTSIDE DEVICES" take place. Thereafter, when the automatic adjuster 120 is similarly connected to the CPU 101, the action immediately proceeds to step S104 where "BATTERY CHECK" is effected. If the battery voltage is insufficient, "NO BATTERY" is displayed on the LCD panel 102. Simultaneously, all the operations of the camera are inhibited.

When moved to step S105, the data is read from the EEPROM 106.

The power switch is checked in step S113. If the power switch is turned OFF, the action proceeds to step S120 wherein the LCD display switched OFF, and there is executed a process of "BK, RW INTERRUPT ENABLED" of switches for opening and closing the back cover and effecting forcible rewinding. Thereafter, the action is stopped. In the case of "POWER SWITCH ON" in step S113, the action proceeds to step S114 to perform LCD displaying. Subsequently, "CHARGE OF ELECTRONIC FLASH" is conducted in step S115. The camera is thereby brought into a photographable state any time.

In "SETTING OF 90 SEC BY TIMER" of step S116, a display time of 90 sec of the LCD is set. Then, if the user manipulates any switch it follows that the 90 sec timer is set again. When moved to step S117, "ELAPSE OF 90 SEC" is judged. If 90 seconds have elapsed, the action moves to step S119. Whereas if not, the action moves to step S118 wherein the camera is set in a "HALT" status after enabling the interruptions by the back cover opening/closing switch BK, the rewinding switch RW and other operation switches (hereinafter, referred to as KEY). When depressing an interrupt enabled switch in the "STOP" and "HALT" modes, a subroutine of "RELEASE OF STANDBY" shown in FIG. 14 subsequent thereto is executed.

Figure 14:
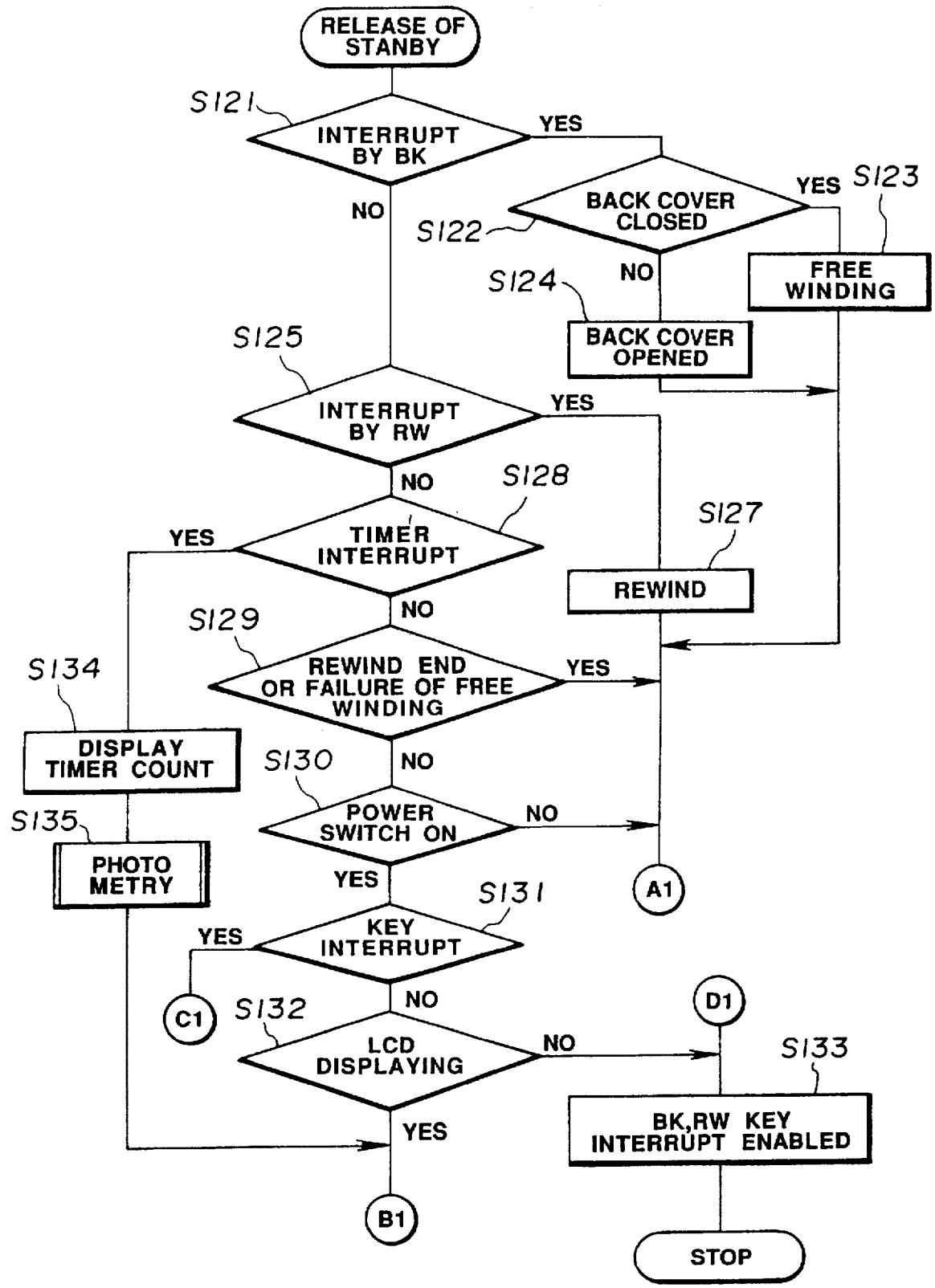
FIGS. 14 and 15 are flowcharts of subroutines of "RELEASE OF STANDBY" in the zoom camera.
Figure 15:
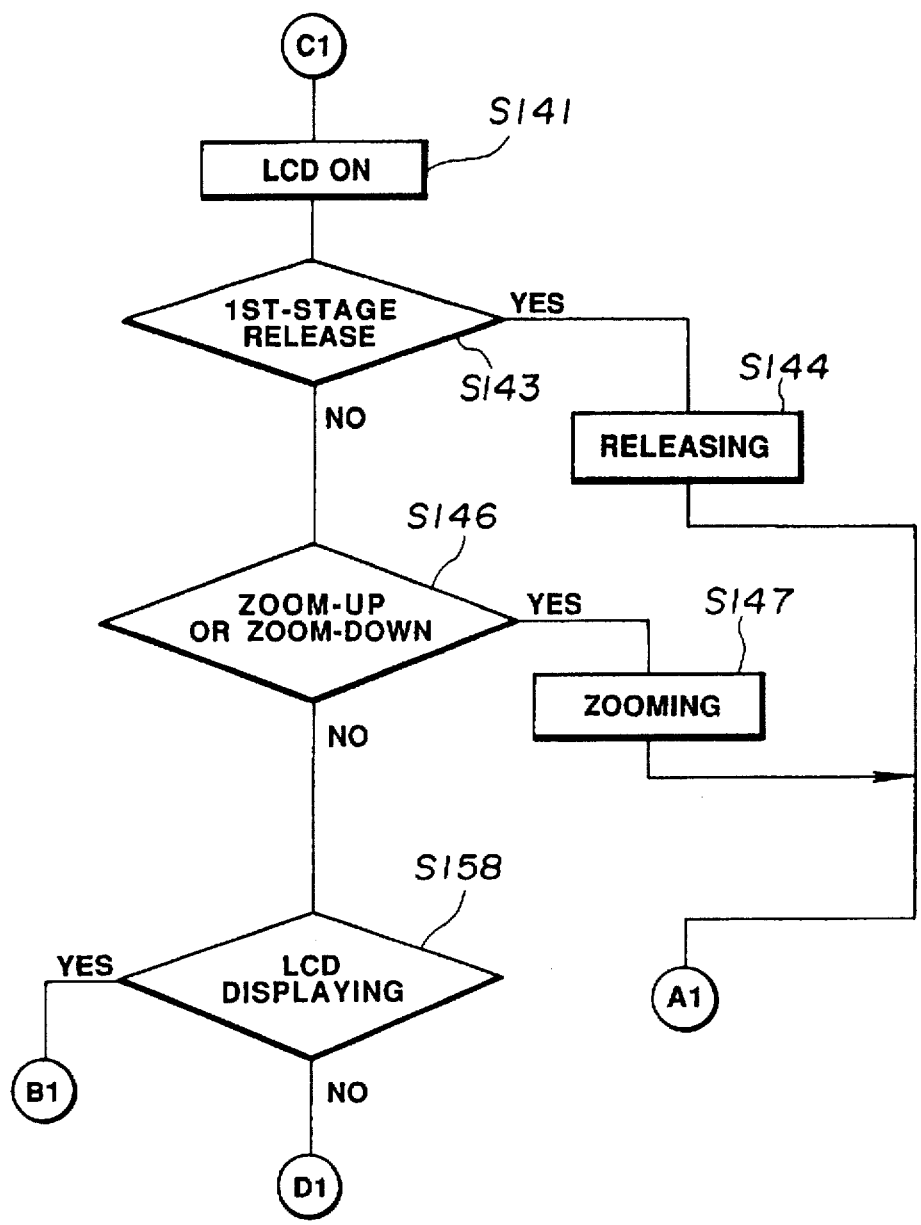

FIGS. 14 and 15 are flowcharts of the subroutine of "RELEASE OF STANDBY". When shifted to the subroutine of "RELEASE OF STANDBY", "INTERRUPT BY BK" of the cover opening/closing switch is at first checked in step S121. "INTERRUPT BY BK" of the back cover opening/closing switch takes place, the action proceeds to step S122. Judged therein is whether a status of "BACK COVER CLOSED" is valid or not. If the status of "BACK COVER CLOSED" is not valid in this step S122, the action moves to step S124, wherein a process of "BACK COVER OPENED" is conducted. Thereafter, the action returns to a flow A1 (see FIG. 13). Further, if the status of "BACK COVER CLOSED" is valid, the action goes back to the flow A1 after performing "free winding" in step S123.

"INTERRUPT BY RW" of the rewinding switch is checked in step S125. If "INTERRUPT BY RW" of this rewinding switch takes place, the action moves to step S127 wherein an operation of "REWIND" is carried out. "TIMER INTERRUPT" is checked in step S128. If "TIMER INTERRUPT" occurs in step S128, the action proceeds to step S134 wherein a process of "DISPLAY TIMER COUNT" is executed. Thereafter, the photometric process is performed in step S135. The action returns to a flow B1. Namely, the photometric process continues during the display. Besides, if "TIMER INTERRUPT" does not take place in step S128, the action moves to step S129. "REWIND END OR FAILURE OF FREE WINDING" is checked therein. If "REWIND END OR FAILURE OF FREE WINDING" is valid in this step S129, the action goes back to the flow A1 so that the camera does not operate. If "REWIND END OR FAILURE OF FREE WINDING" is not valid, the action proceeds to step S130. In this step S130, a state of the power switch is checked. If turned OFF, the action returns to the flow A1. Whereas if turned ON, the action proceeds to step S131, and the main flow continues.

In step S131, "KEY INTERRUPT" is judged. More specifically, if an interrupt takes place upon depressing each mode switch which will hereafter be explained, a flow C1 is executed. Whereas if not, the action moves to step S132. In this step S132, whether a status of "LCD DISPLAYING" is valid or not is checked. If not, the action proceeds to step S133 wherein a status of "BK, RW, KEY INTERRUPT ENABLED" of the respective switches is made effective. The camera is thereby into a stopping state. Further, if the status of "LCD DISPLAYING" is valid in step S132, the action returns to the flow B1. Note that "KEY" in steps S117, S131 and S133 indicates en bloc the switches "1R", "2R", "Z-UP" and "Z-DOWN" in the switch manipulation unit 103 shown in FIG. 12.

The following is an explanation of a flow C1 when, as described above, the interrupt by the operation switch "KEY" takes place. To begin with, the action moves to step S141. If the KEY interrupt occurs, the LCD 102 is turned ON. Next, the action proceeds to step S143. Checked therein is whether or not a "1ST-STAGE RELEASE" switch is depressed. If the "1ST-STAGE RELEASE" switch is depressed, the action moves to a flow of "RELEASING" in step S144. After executing "RELEASING", the action returns to the flow A1. Whereas if the "1ST RELEASE" switch is turned OFF, the action moves to step S146. Whether an indication of "ZOOM-UP OR ZOOM-DOWN" is checked. If the indication of "ZOOM-UP OR ZOOM-DOWN" is not given therein, the action moves to step S158. Whether the status of "LCD DISPLAYING" is valid or not is checked in step S158, and the action returns to the flow B1 or D1. Whereas if the indication of "ZOOM-UP OR ZOOM-DOWN" is given, "ZOOMING" is carried out in step S147. The action then goes back to flow A1.

The flows described above are of the subroutine of "RELEASE OF STANDBY". Given next is an explanation of a subroutine of "RELEASING" in step !44 in the subroutine of "RELEASE OF STANDBY" shown in FIG. 15 with reference to a flowchart of FIG. 16. When "1ST-STAGE RELEASE" is effected, "FOCUSING" is conducted in step S161 in FIG. 16. Subsequently, an amount of extension of the lens and an exposure time are computed in step S162. The action then moves to step S164. Based on a focusing value, "EXTENSION OF LENS" is performed by driving the AF motor 115 (see FIG. 12) in step S164. After this step, the action proceeds to step S166. In this step S166, "2ND-STAGE RELEASE" is checked. If in an OFF-state, the action moves to step S167, wherein "1ST-STAGE RELEASE" is checked again.

Further, if the "1ST-STAGE RELEASE" in step S167 is in the OFF-state, the action mpves to a flow of "RESET OF LENS" in step S178. Besides, assume that the "2ND-STAGE RELEASE" switch is depressed when step S166 is reached. When the switch "2R" is thus turned ON, the action moves to step S168 to perform "BATTERY CHECK". Whether a flow of exposure can be conducted or not is checked. Then, the action proceeds to step S171 wherein the plunger 121 (see FIG. 12) is driven. After performing "EXPOSURE" in this step S171, the action moves to step S174, in which "ONE FRAME WINDING" of the film is carried out. If this one frame winding is finished in a given time, this is judged as a film end. The wind motor 116 (see FIG. 12 rotates reversely to automatically rewind the film. Then, the action further moves to steps S177 and S178, wherein "RESET OF SELF-MODE" is executed, followed by "RESET OF LENS". When returned to the initial position by effecting "RESET OF LENS", the subroutine of this "RELEASING" comes to an end.

Next, a flow of zooming will be described in conjunction with FIGS. 17 and 18.

Figure 17:
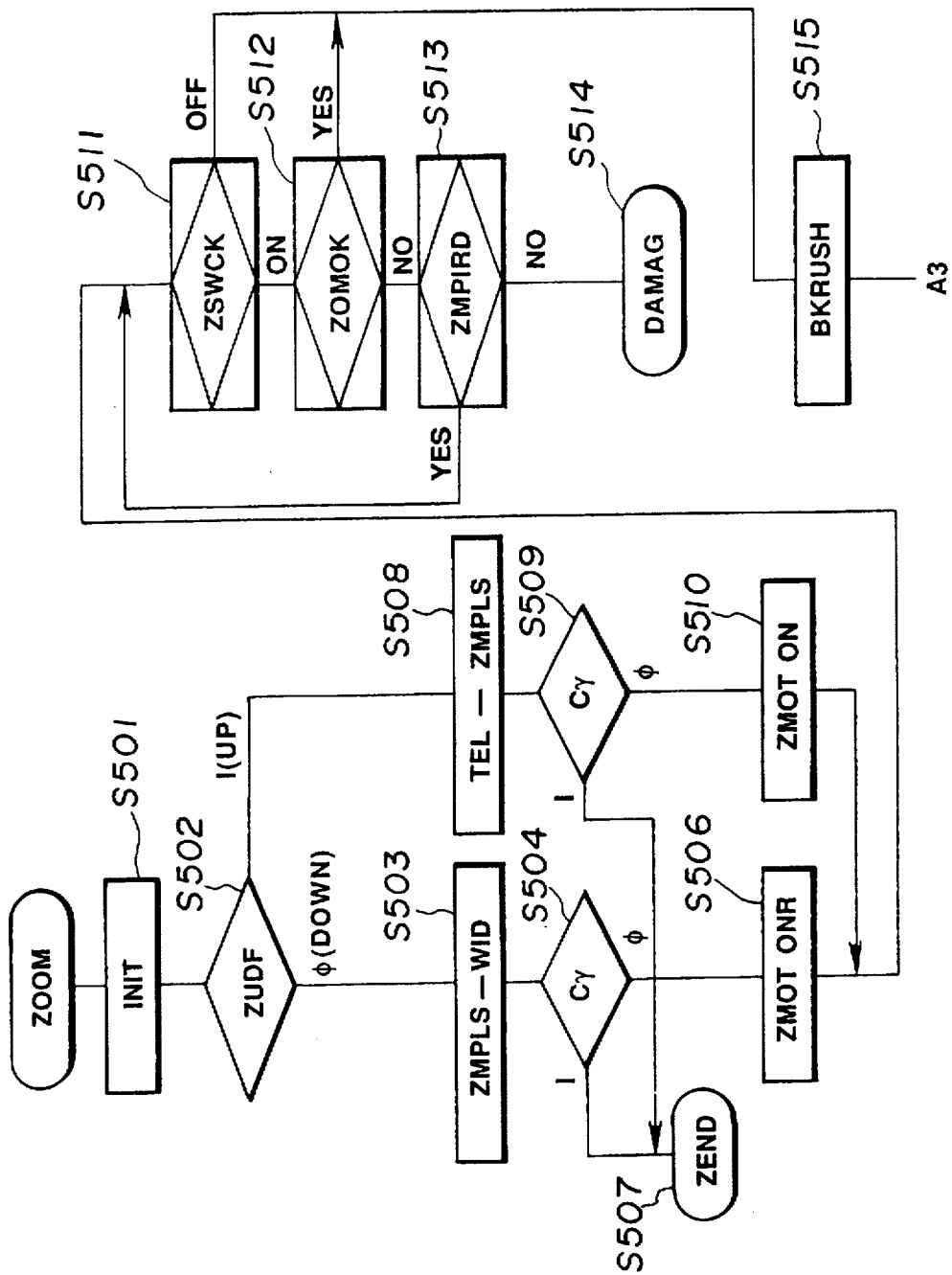
FIGS. 17 and 18 are flowcharts each showing a zooming action of the zoom lens.
Figure 18:
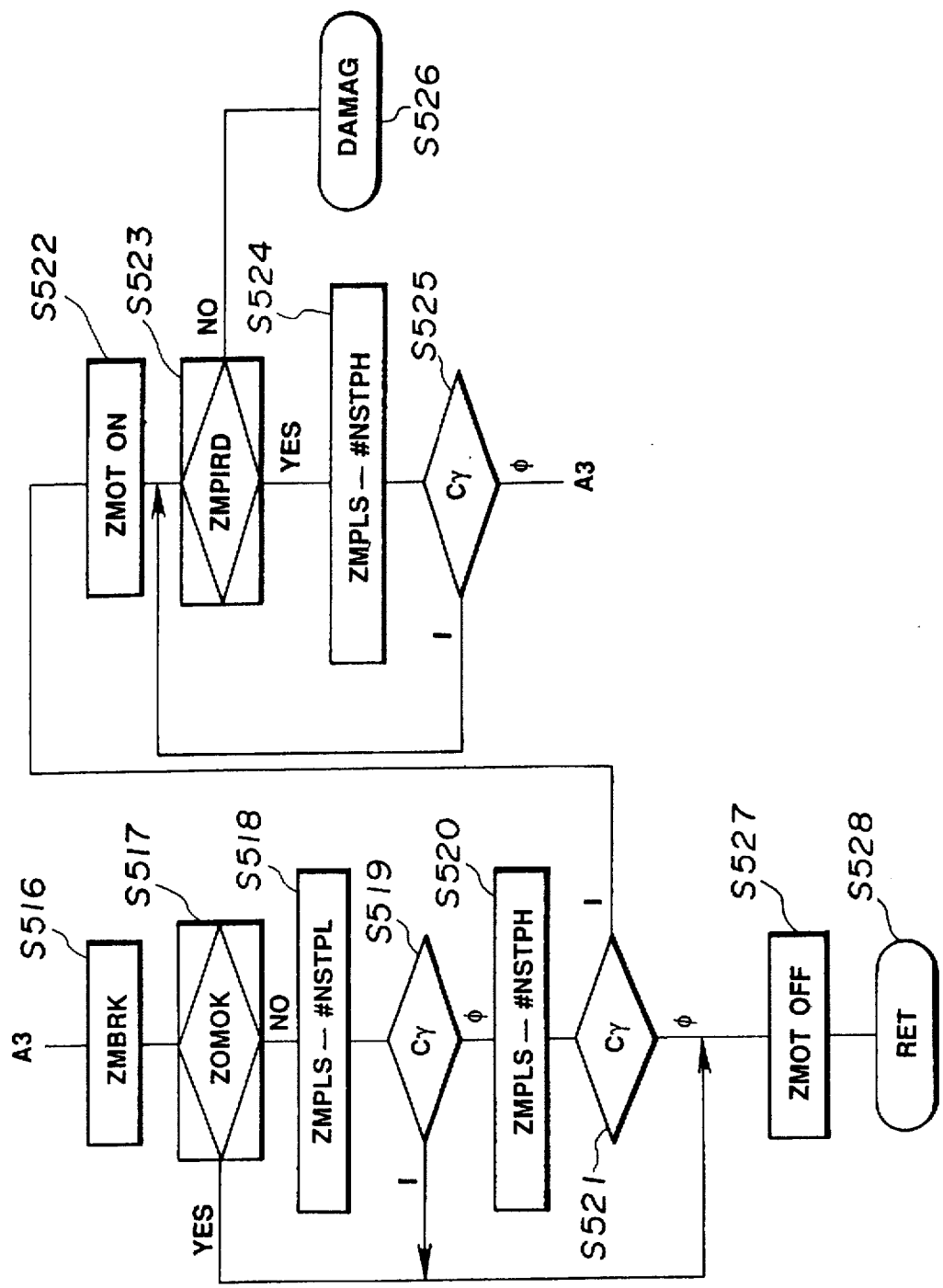

Firstly, as illustrated in FIG. 17, the IF-IC is initialized for operating the CPU port and the zoom motor in step S501. Next, the action moves to step S502 to check a zoom-up/zoom-down flag (ZUDF). This flag is set during the switch-check judgement. Then, when the zoom-up is set, this indicates "1", and the action moves to step S508. When the zoom-down is set, this indicates "0", and the action proceeds to step S503. In step S503, a constant (WID) for determining a wide-angle position is subtracted from RAM (ZMPLS) containing the current pulse value (ZMPLS is held even when subtracted). As a result, if there is a borrow in step S504 ($C_y=1$), the zoom lens is retracted from the wide-angle position. Hence, the action returns to the main loop via step S507. Further, in the case of "0" in step S504, the zoom motor is rotated reversely (ZMOTONR) in step S506.

In the case of moving to step S508, the current value (ZMPLS) is subtracted from a constant (TEL) for determining a telephoto position. As a consequence, if there is a borrow in step S509 ($C_y=1$), the zoom lens is extended from the telephoto position. The action therefore goes to the main loop via step S507. Besides, when being "0" in step S509, the zoom motor is rotated forwards (ZMOTON) in step S510.

Then, the action proceeds to step S511, wherein a voltage of the zoom motor is set. Checked simultaneously is whether or not the zoom-up switch ZUPSW and the zoom-down switch ZDOWNSW are turned OFF (ZSWCK). If the zoom switch is turned ON, the action moves to step S512. Whereas if turned OFF, the action goes to step S515. In step S512, it is judged that the zoom lens comes to the zoom end when the current value of the zoom pulse turns out a wide-angle or telephoto value (ZOMOK). The action then moves to step S515. In other cases, the action goes to step S513. In step S513, whether a pulse edge (available both in rising and in falling) of zooming PI comes or not is judged. When the edge comes, the current pulse value ZMPLS is set to "+1" in the case of zoom-up while looking at a flag ZUDF. The current pulse value is set to "−1" in the case of zoom-down (ZMPIRD). Then, when the edge does not come even after a given time has elapsed, the zooming condition is judged abnormal. The action moves to step S514 for stopping the zoom motor.

In step S515, a backlash of the gear is taken for shifting a play of the zoom in a fixed direction (BKRUSH). If the zoom motor is driven to make reverse rotations, the zoom motor is forced to rotate forwards by a predetermined number of pulses. Subsequently, the zoom motor is braked (see FIG. 18) in step S516 (ZMBRK). Then, the action moves to step S517. Whether the current value of the zoom pulse is a wide-angle value or a telephoto value is checked therein (ZOMOK). If the answer to this is Yes, the action jumps to step S527 for switching OFF the zoom motor and then returns to the main flow. If the answer is No, the action moves to step S518, wherein, as shown in the present invention, a constant (NSTPL) indicating a lower limit of a zoom non-stop area is compared with the current value (ZMPLS). Then, if there is a borrow in step S519, the current value (ZMPLS) is the constant (NSTPL) or under, and hence the action proceeds to step S527. Whereas if no borrow, the action moves to step S520. Effected in step S520 is subtraction for comparing a constant (NSTPH) indicating an upper limit of the zoom non-stop area with the current value (ZMPLS). As a result, if there comes out no borrow in step S521, the current value is larger than the constant (NSTPH), and the action therefore goes to step S527. If there is the borrow, the action moves to step S522.

In step S522, the zoom motor is again switched ON (ZMOTON). Subsequently, the action proceeds to step S523 for checking the edge of the zoom PI (ZMPIRD). If there is the edge, the action goes to step S524. If the edge does not come in a given time, the action moves to step S526. In step S524, the current value (ZMPLS) is compared with the constant (NSTPH) indicating the upper limit of the zoom non-stop area. Then, if there comes out the borrow in step S525, the current value (ZMPLS) is smaller than the constant (NSTPH) indicating the upper limit of the zoom non-stop area. The action therefore returns to step S523. If there is no borrow, the action moves to step S516 (through A3). After going to step S516, the current value (ZMPLS) is greater than or equal to the constant (NSTPH) indicating the upper limit of the zoom non-stop area. Hence, the action skips over to step S527.

If zooming is abnormal in step S526, the action goes to damage processing (DAMAG). Damage processing involves an execution of processing of the zoom motor. Further, the zoom motor is switched OFF (ZMOTOFF) in step S527. Then, the action returns to the main flow in step S528.

The above is the explanation of the zooming operation.

Figure 10:
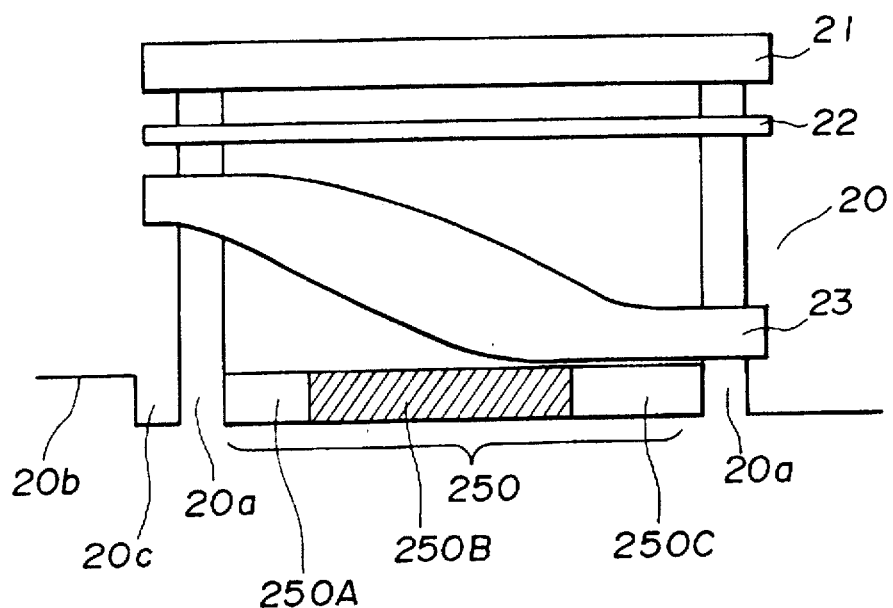
FIG. 10 is a plan view fully showing a zoom encoder provided in the driving cylinder.

Next, the operation of the zoom encoder 250 shown in FIG. 2 will be described. FIG. 10 illustrates a state of the zoom encoder 250 incorporated in the driving cylinder 20. The zoom encoder 250 is constructed of three subencoders, i.e., a collapsible unit sub-encoder 250A, a photographing area sub-encoder 250B and a T sub-encoder 250C. The collapsible unit sub-encoder 250A and the T sub-encoder 250C among them assume a silver or white color to exhibit a high reflectivity. The photographing area sub-encoder 250B assumes, e.g., a black color to exhibit a low reflectivity.

Figure 11:
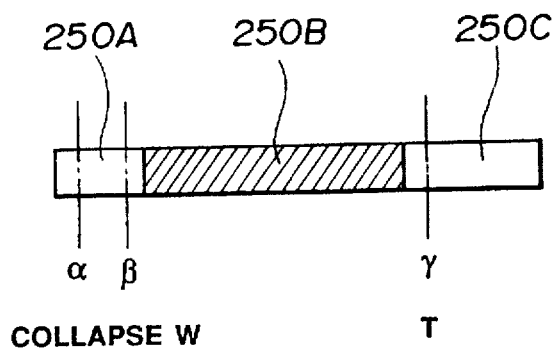
FIG. 11 is a diagram showing a relation between telephoto, wide-angle and collapsing positions of the zoom lens and the zoom encoder.

FIG. 11 shows a relation between the zoom encoder 250 and an unillustrated photo reflector provided in the camera body. The driving cylinder 20, as illustrated in FIG. 2, rotates clockwise (arrow B) or counterclockwise (arrow A) in the zooming operation. Hence, it follows that the zoom encoder 250 also rotates clockwise (arrow B) or counterclockwise (arrow A) relative to the photo reflector (PR) fixed to the camera body. More specifically, the collapsible state is a state where the photo reflector (PR) assumes a position α shown in FIG. 11. The wide-angle state is a state where the photo reflector (PR) assumes a position β. The telephoto state is a state where the photo reflector (PR) assumes to a position γ. A zoom state is thus detected.

Further, the zoom driving unit incorporates the photo interrupter (PI). The CPU 101 counts PI pulses from the wide-angle position that are generated by outputs of the photo reflector (PR) in the section of the photographing area sub-encoder 250B. The count value serves as zoom information. Counting of the PI pulses is reset and set in the wide-angle position and the telephoto position.

To be more specific, when depressing the zoom-up switch and the zoom-down switch of the switch manipulation unit 103 shown in FIG. 12, the CPU 101 actuates the zoom driving unit (not illustrated). A lens frame unit (not shown) is thereby driven. At this time, a PI 118a outputs a predetermined pulse. The pulse is inputted to the CPU 101. Further, the lens frame unit is driven, whereby an output of a PR 118a fixed to the camera body changes. This output is also regularly inputted to the CPU 101. The CPU 101 regularly detects a current focal distance from the outputs of the PI and the PR. The CPU 101 makes a comparison as to whether or not the current focal distance coincides with a specified focal distance stored in a fixed ROM (EEPROM 106 for storing the adjusting value may also be available) provided in the CPU 101.

Then, zooming is conducted on depressing the zoom switch. A focal distance when stopping the depression of the zoom switch coincides with the focal distance stored in the ROM 106, i.e., the focal distance corresponding to run-offs 10b shown in FIG. 8. In this case, the zoom driving unit is further driven. Zooming continues till the focal distance deviates from the value stored in the ROM 106, and the action stops.

Figure 9:
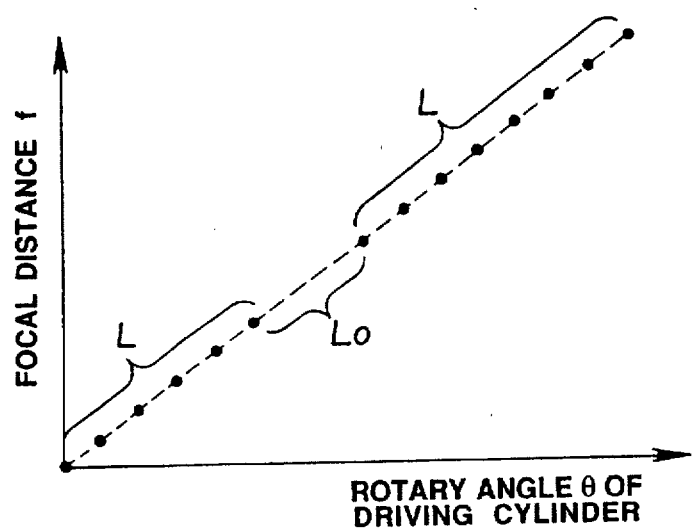
FIG. 9 is a diagram of a characteristic line showing a relation between a rotary angle of the driving cylinder and a focal distance of a zoom lens.

Drive control of the zoom lens to which the present invention is thus applied will be explained in greater detail with reference to FIG. 9. FIG. 9 is a graph showing characteristics, wherein the axis of abscissa indicates a rotary angle θ of the driving cylinder 20, and the axis of ordinate indicates a focal distance f. A characteristic segment Lo corresponding to the run-offs 10B in the characteristic line L is formed halfway. This characteristic segment Lo is defined as an unstoppable area of the zoom lens. Accordingly, when coming to this position, as described earlier, the lens is shifted to a position slightly deviating from this position and then stops. There is no possibility in which photographing takes place in a discontinuous portion of the cam groove by conducting such control. Uniformly stable optical performances (focusing state, lens interval) are kept during photographing.

Further, in accordance with the embodiment discussed above, a parting line of the cam groove 10A is provided substantially at the center of the cam groove 10A. The lens does not stop only in this position during the zooming action. This position may be, for instance, close to the telephoto side or the wide-angle side. Besides, if two or more parting lines are provided, the arrangement may be such that the zooming action does not stop at two or more specific focal distances.

Next, a second embodiment of the present invention will be described with reference to FIGS. 19 through 22.

Figure 19:
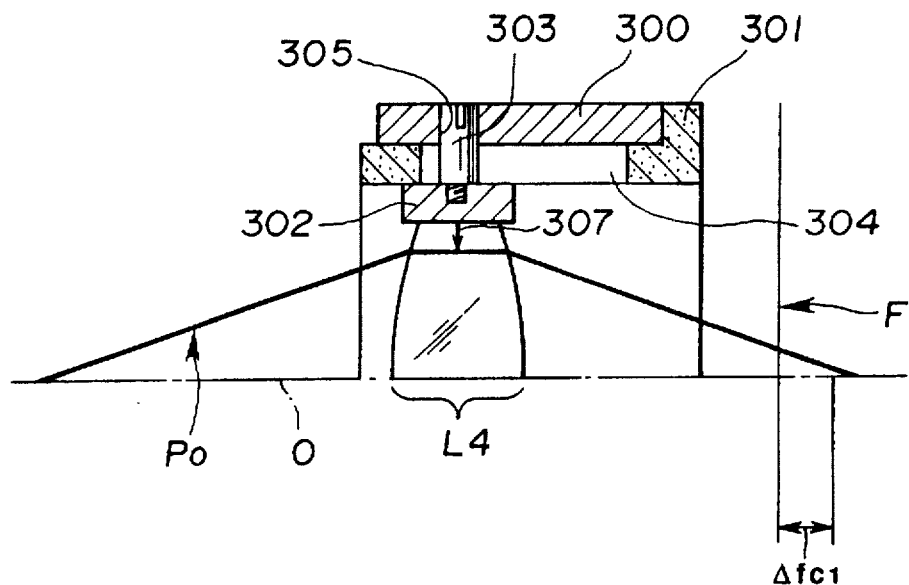
FIG. 19 is an enlarged principal sectional view of the lens barrel, showing a second embodiment of the present invention.

FIG. 19 is an enlarged sectional view illustrating the principal portion of the lens frame unit to which the present invention is applied. A rotatable cam cylinder 300 is fitted to the outer periphery of a fixed cylinder 301 fixed to the unillustrated camera body. A lens holding frame 302 for holding a lens group L4 is also fitted to the inner peripheral portion of the fixed cylinder 301. A cam-follower 303 consisting of a driving pin is embedded in the outer peripheral portion of the lens holding frame 302. This cam-follower 303 is constructed to be inserted into a guide linear elongate slot 304 formed in the fixed cylinder 301 in the optical-axis direction O. The cam-follower 303 is also inserted into a cam slot 305 formed in a cam cylinder 300. Hence, when the cam cylinder 300 rotates about the optical axis, the lens holding frame 302 moves linearly in the optical-axis direction by the cooperating actions of the cam slot 305 and the linear elongate slot 304.

A configuration of the cam slot 305 formed in the cam cylinder 300 will herein be described with reference to FIG. 20.

Figure 20:
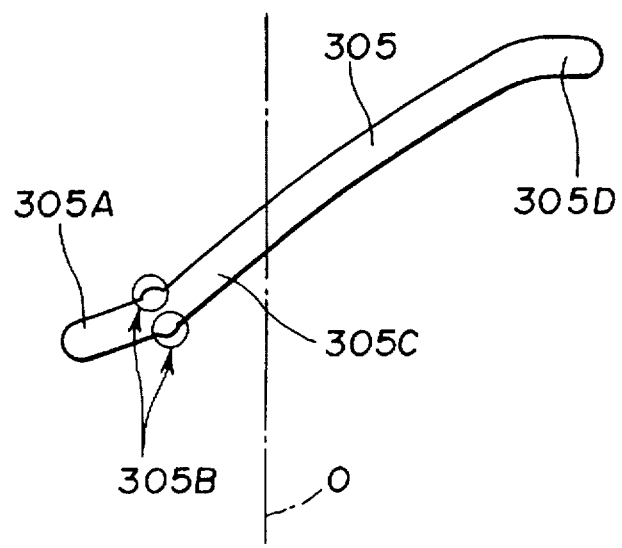
FIG. 20 is a plan view of a cam slot, showing one example of a discontinuous part of the cam slot in the lens barrel in the second embodiment.

The cam slot 305 shown in FIG. 20 takes such a configuration that the slot 305 is substantially inclined relative to the optical axis O. Holes skewed in the directions opposite to each other are further formed at both ends thereof. A discontinuous part 305B is formed intermediate ends 305A, 305D. In accordance with this embodiment, a photographing lens accommodating part 305A is provided at the left hand of this discontinuous part 305B. An infinity part 305C is provided to the right hand of the discontinuous part 305B. Further, a closest focusing part 305D is provided at the right end of the cam slot 305. Namely, the discontinuous part 305B of the cam is disposed midway from the lens accommodating state to the infinity state in this embodiment.

The operation of the thus constructed lens barrel will be stated. An unillustrated lens driving unit at first rotates the cam cylinder 300. Then, the lens holding frame 302 moves in the optical-axis direction O by the actions of the cam slot 305 formed in the cam cylinder 300 and the linear elongate slot 304 formed in the fixed cylinder 301.

With this action, a light beam Po incident on the lens group L4 from a subject is image-formed on the film surface F. That is, a moving quantity of this lens frame 302 is determined based on information given from an unillustrated focusing element.

Where the cam slot 305 assumes the configuration shown in FIG. 20, there arises no problem even if whatever information is given from the focusing element. It is because the cam discontinuous part 305B is not employed in the area used normally used for photographing. More specifically, the lens simply runs over the discontinuous part 305 to the accommodating part from the normal photographing area in the lens accommodating state. The lens does not have to halt at the discontinuous part 305B. Further, when shifting the lens from the accommodating state to a photographing state, the lens may be moved to the normal photographing area after running over the discontinuous part 305B from the accommodated position. The lens is not required to halt at the discontinuous part 305B. Hence, there is no problem even when controlling the movement of the lens group L4 so that the lens does not halt at the discontinuous part 305B in this case.

Figure 22:
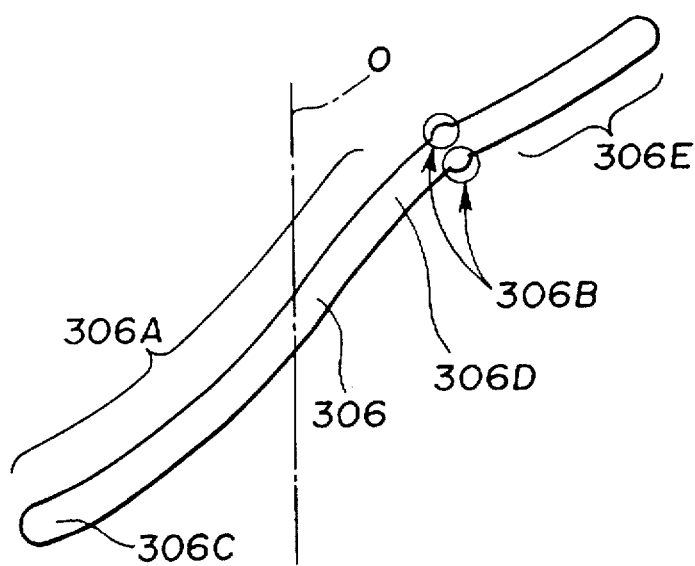
FIG. 22 is a plan view of the cam slot, showing another example of the discontinuous part of the cam slot in the lens barrel in the second embodiment.

Besides, FIG. 22 shows another example in which the configuration of the cam slot is different. In this example, an infinity part 306C is provided at the left end of a cam slot 306. A discontinuous part 306B is formed rightward of an intermediate part. A closest focusing part 306D of a normal photographing area 306A is provided at the left end thereof. Further, a macro photographing area 306E extends from the right of the discontinuous part 306B.

In this example, the discontinuous part 306B is disposed between the normal photographing area 306A and the macro photographing area 306E. Then, normal photographing area 306A and the macro photographing area 306E are properly changed over by manipulating an unillustrated changeover button. Although a problem does not arise in terms of practicality if the discontinuous part 306B exists in the middle therebetween, the construction is not necessarily made in such a manner. Namely, distinguishing the normal photographing area 306A from the macro photographing area 306E simply implies a distinction in terms of length of a distance from a subject in some cases. In this case, the subject may exist at the subject distance corresponding to the discontinuous part 306B in the cam slot.

In this instance, if the lens group L4 stops at the discontinuous part 306B, the photographing lens system goes unstable. This results in an extremely ill-shot state of the photo.

For this reason, if the subject exists in the position corresponding to the discontinuous part 306B, the lens frame 302 is shifted to a position deviating from the discontinuous part 306B as in the first embodiment. At this time, the lens group does not exist in the position corresponding to the subject distance simply by shifting it. The photo is still brought into the ill-shot state. Therefore, in this case, a stop 307 (see FIG. 19) provided in the lens group is set as below.

More specifically, as illustrated in FIG. 19, the lens is moved to the position deviating from the discontinuous part 306B of the cam. In consequence, a light beam Po incident from the subject is image-formed in a position deviating by $\Delta$fcl from the film surface F. Supposing that $\delta$1 is the size of a blur circle, and if $\delta$1 is larger than a size $\delta$ (=approximately 30µ to 50µ) generally judged as an in-focus state, an out-of-focus state is produced. By the way, the size of $\delta$1 changes depending on an aperture of the stop of the photographing lens. To be specific, if the aperture is large (stop value is small), $\delta$1 is also large. Whereas if the aperture is small (stop value is large), $\delta$1 is also small. Accordingly, $\delta$1 can be reduced under $\delta$ by controlling the aperture of the stop. Therefore, even when the lens is stopped by steering clear of the discontinuous part 306B of the cam groove, a deviation between the stop position and the subject position may fall within a focalizing range by setting the aperture of the stop.

Figure 21:
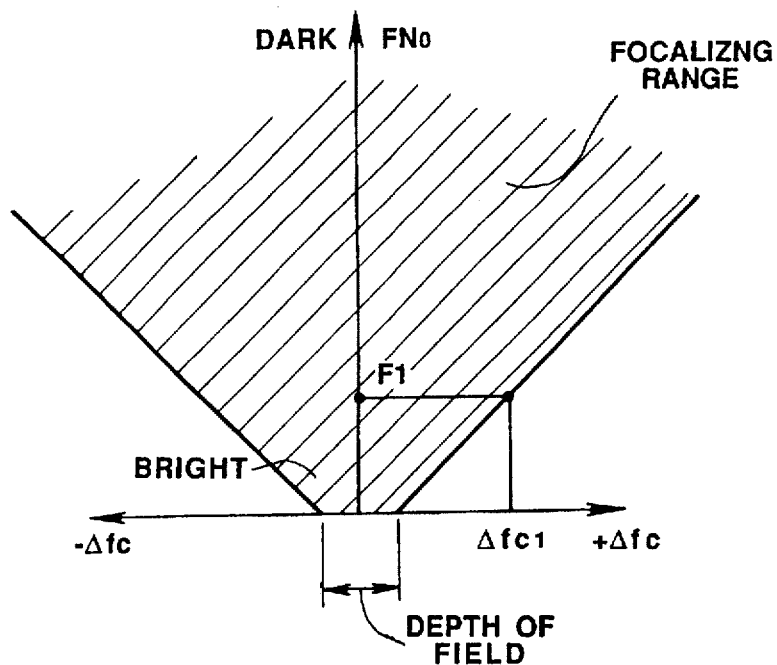
FIG. 21 is a diagram showing a relation between a stop aperture and a depth of field.

FIG. 21 is a view for explaining this relation therebetween. An area defined by oblique lines in FIG. 21 is an in-focus range. The aperture may be, it can be understood, stopped down so that $\Delta$fcl comes to F1 defined as an in-focus FNo.

Incidentally, this example is given on the premise that the discontinuous part 306B is disposed between the normal photographing area 306A and the macro photographing area 306E. As stated above, however, the arrangement is not limited to this example. As a matter of course, a well-focused photo can be taken even by providing the discontinuous part 306B in the middle of the normal photographing area 306A. This involves control to prevent the lens from stopping in this part and control of the stop to reduce the aperture of the lens, correspondingly.

Figure 16:
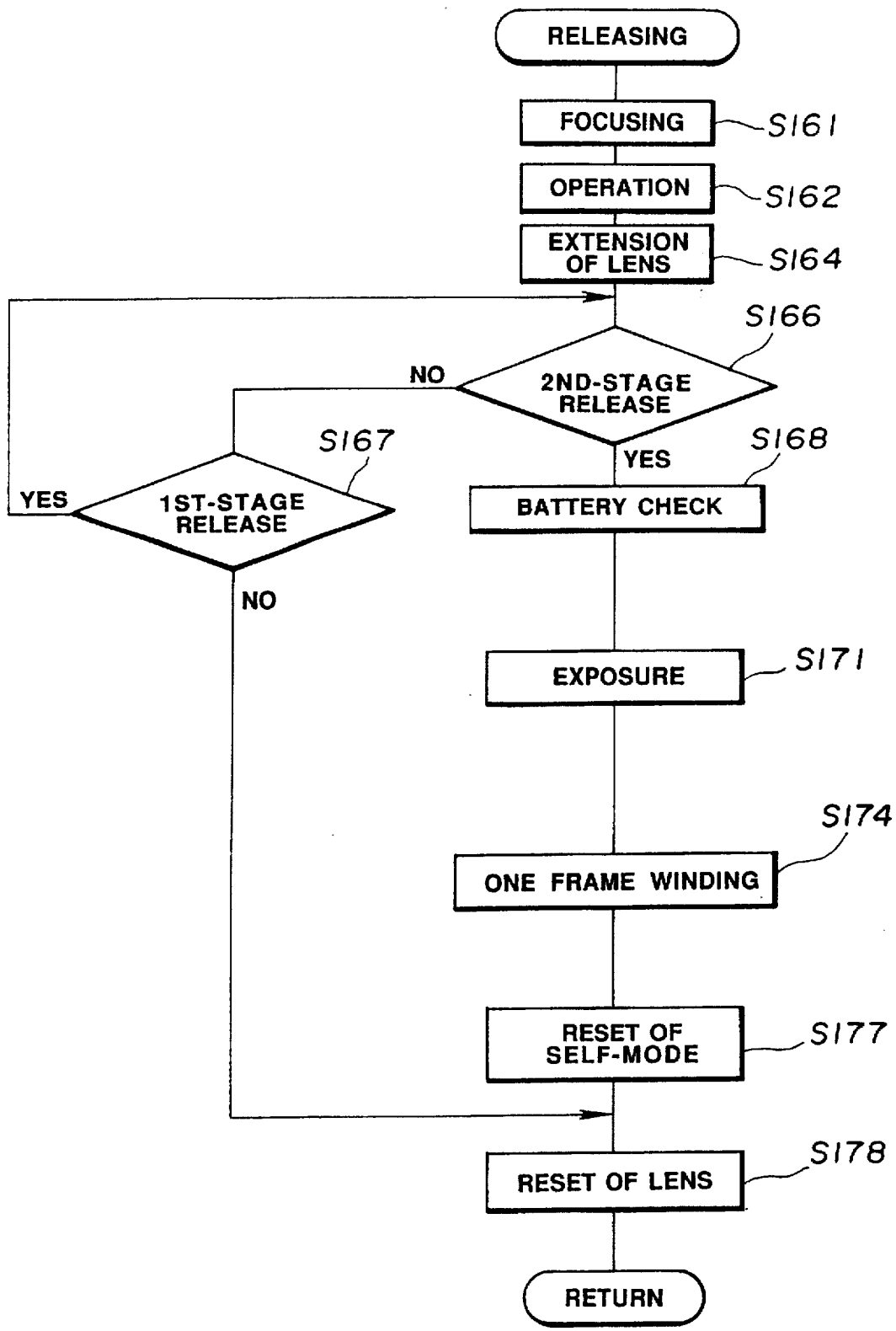
FIG. 16 is a flowchart of a subroutine of "RELEASING" in the subroutine of "RELEASE OF STANDBY"
Figure 23:
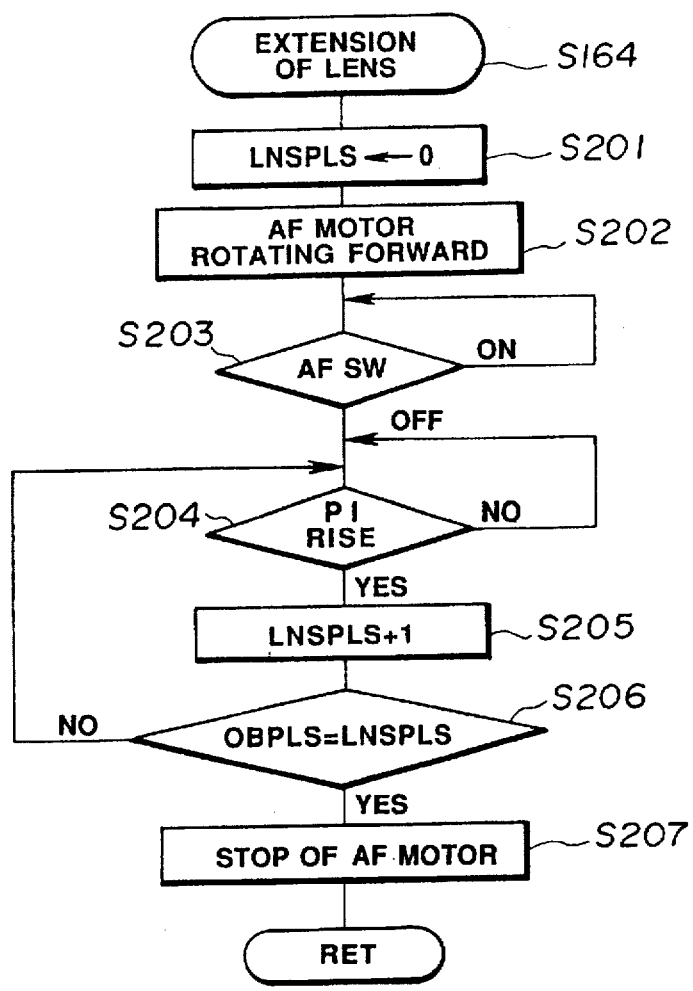
FIG. 23 is a flowchart showing a lens extending operation in the lens barrel in the second embodiment.

The following is an explanation of a flow of extension of the lens and reset of the lens in the second embodiment with reference to FIG. 23. In this case also, the lens is extended during the releasing process as shown in FIG. 16. Then, in step S201, as illustrated in FIG. 12, the pulses are outputted from a photo interrupter 118c with the operation of an AF motor 115. A register for counting the pulses is cleared. Subsequently, in step S202, the AF motor is rotated forwards to extend the lens. Next, in step S203, the lens is disposed in a position substantially in the vicinity of infinity. A check is made whether an AF switch (unillustrated) turned ON when in the initial position is turned OFF or not. The AF switch may be, of course, provided on the lens accommodating side or anywhere in the discontinuous part. In this instance, a target pulse OBPLS is properly set. When AFSW is turned OFF, a rise of the pulse transmitted from PI 118c is detected subsequently in step S204.

Next, upon detecting the rise thereof, a pulse counter LNSPLS is incremented by 1 in step S205. Then, in step S206, whether or not LNPLS is equal to OBPLS is checked. If not equal, the action returns to step S204. When LNSPLS is equal to OBPLS, the AF motor is stopped in step S207. The action returns to the main routine.

Figure 24:
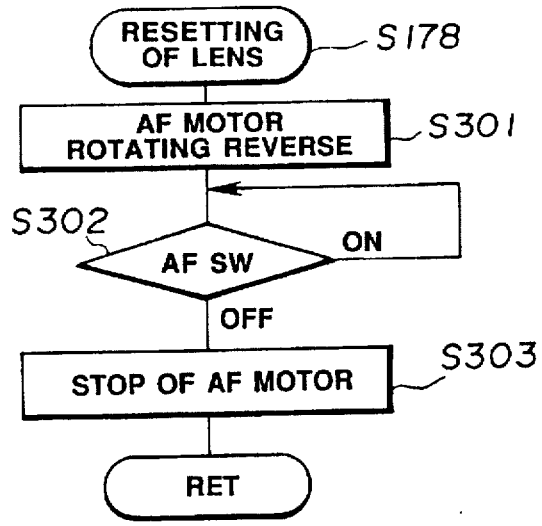
FIG. 24 is a flowchart showing "RESETTING OF LENS" in the lens barrel in the second embodiment.

A flow of lens resetting will next be explained with reference to FIG. 24.

Referring to FIG. 16, after the lens has been extended in step S164, the lens is reset in step S178. Then, in step S301, the Af motor is rotated reversely. Checked next in step S302 is whether or not AFSW for detecting the initial position is turned OFF. When AFSW is turned OFF, the motor is stopped in step S303, and the action goes back to the main routine.

The lens is extended under the control described above. In the arithmetic operation in step S162 in FIG. 16, however, setting is conducted so that the discontinuous part does not enter OBPLS.

Figure 25:
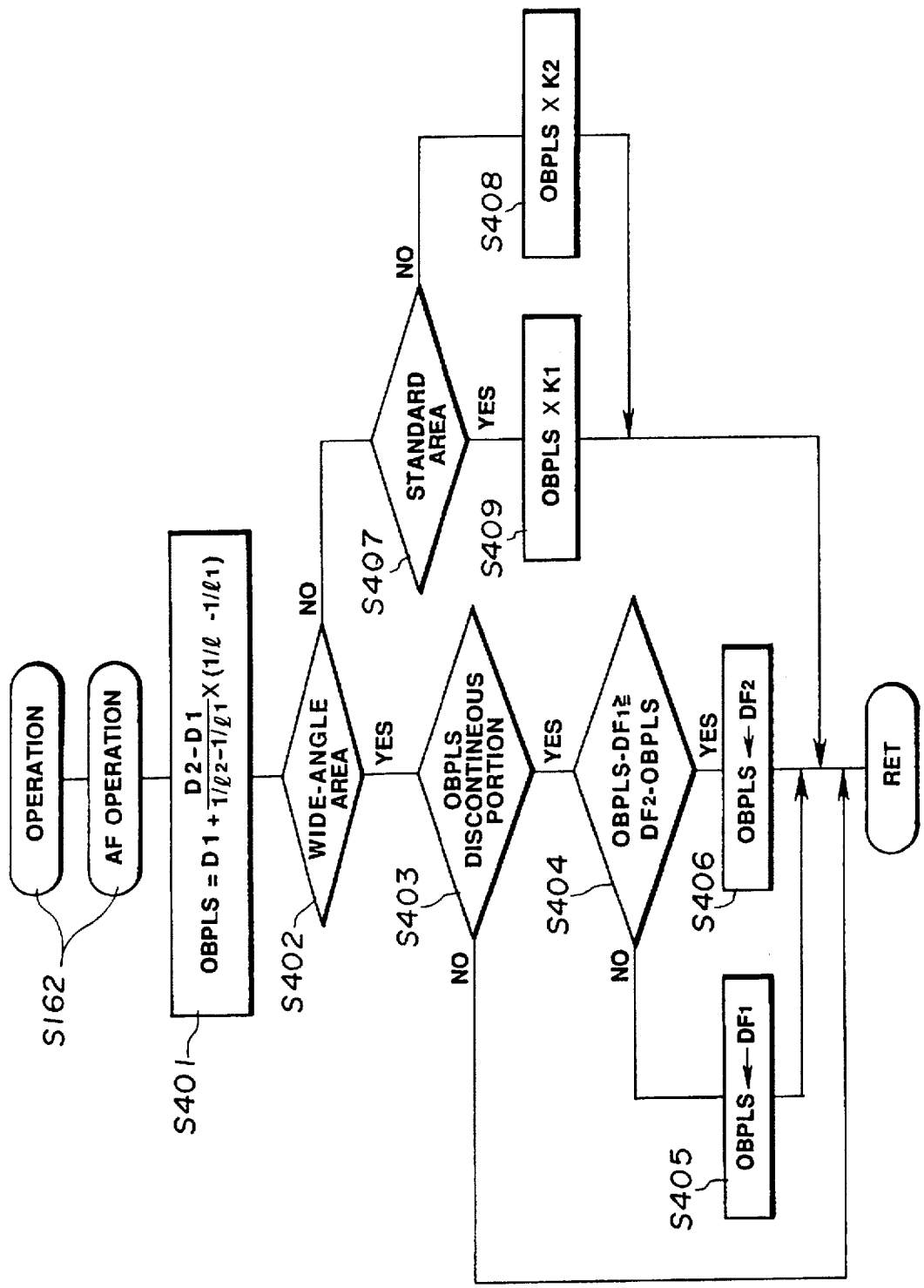
FIG. 25 is a flowchart of a subroutine of operation for controlling a lens extending position in the lens barrel in the second embodiment.
Figure 26:
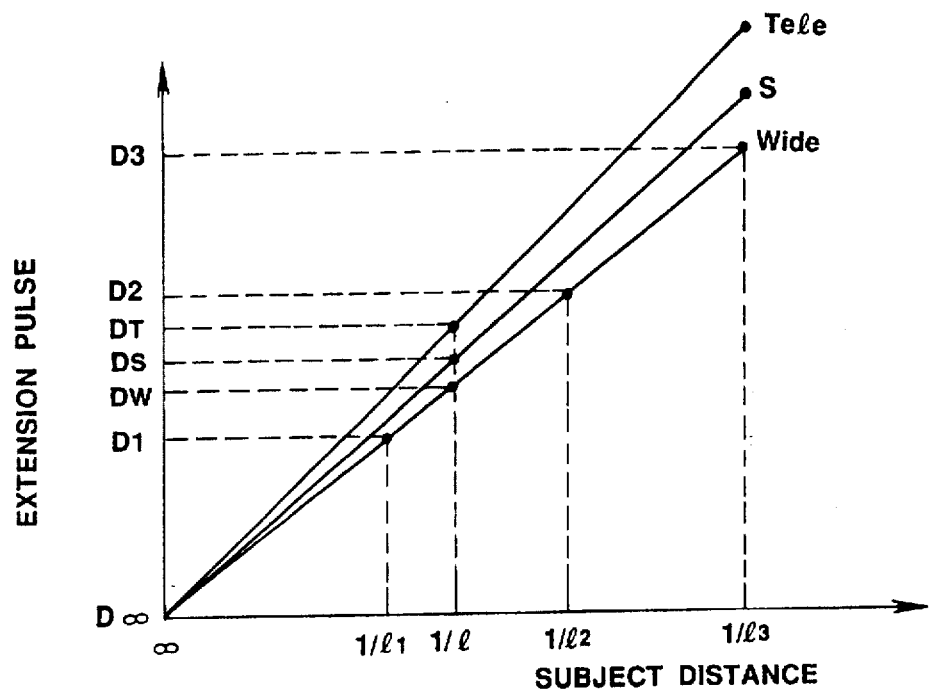
FIG. 26 is a diagram showing a relation between pulses for extending the lens and distances from a subject.

This arithmetic operation will hereinafter be exemplified. FIG. 26 shows a relation between subject distances and feed pulses. Herein, feed pulses $D\infty$, $D_1$, $D_2$, $D_3$ corresponding to a distance ∞, $l_1$, $l_2$, $l_3$ are stored in the EEPROM 106 shown in FIG. 12. Supposing that l is the distance measured in step S401 as shown in FIG. 25, the target feed pulse OBPLS is obtained by effecting an interpolation arithmetic with data $D_1$ corresponding to $1/l_1$ and data $D_2$ corresponding to $1/l_2$. Namely, OBPLS is given by:

$$OBPLS = D_1 + \frac{D_2 - D_1}{1/l_2 - 1/l_1} \times (1/l - 1/l_1)$$

Next, whether or not a zoom value is in a wide-angle area is checked in step S402. In a certain case, the action moves to step S403. Then, whether OBPLS is in the discontinuous part or not is checked. If in the discontinuous part, the action goes to step S404. Whereas if not, the action returns to the main flow.

An area of the discontinuous part is delimited by $DF_1$ and $DF_2$ ($DF_2$>$DF_1$) in step S404. In step S404, OBPLS is determined to be $DF_1$ or $DF_2$.

Namely, if OBPLS−$DF_1$>$DF_2$−OBPLS, OBPLS is determined to be $DF_2$ in step S406. Whereas if not, OBPLS is determined to be $DF_1$ in step S405.

Further, if not in the wide-angle area, the action shifts to this step S407. Whether in a standard area or not is checked therein. If in the standard area, the action moves to step S409. If not in the standard area, this is a telephoto area. Therefore, OBPLS is multiplied by a telephoto coefficient K2 in step S408. The action then returns to the main flow. Further, when in the standard area, OBPLS is multiplied by a coefficient K1 in step S409.

The arithmetic operations are performed as described above, thereby preventing a target position of lens extension from entering the discontinuous part.

Figure 27:
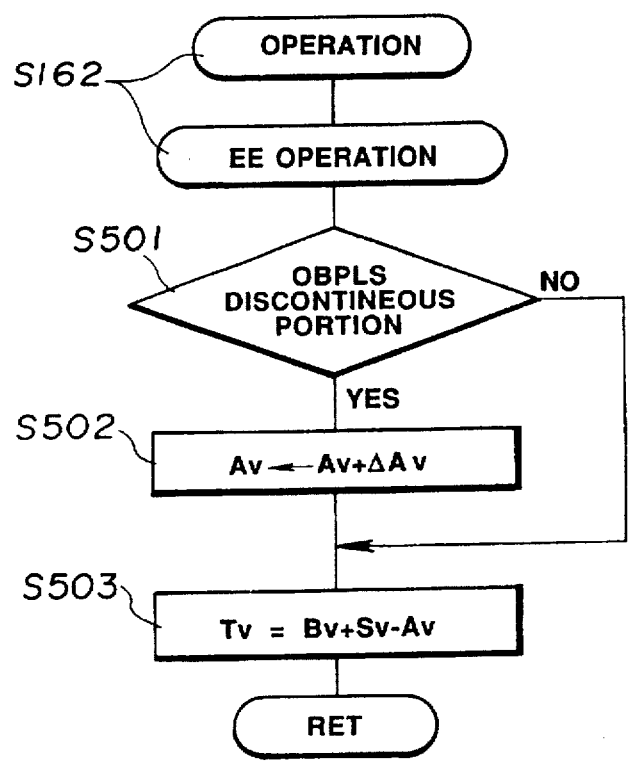
FIG. 27 is a flowchart showing how stop information is compensated in an automatic exposure operation in the lens barrel in the second embodiment.

Still further, as stated in the above-mentioned embodiment, if the subject corresponds to the discontinuous part, and when the lens is moved, the lens group does not exist in the position corresponding to the subject distance. The photoed-condition declines. In this case, the aperture of the stop is required to be decreased. At this moment, the stop information may be compensated similarly in the AF operation in the arithmetic flow S162. The arithmetic operation shown in a flow of FIG. 27 is performed. To be specific, whether OBPLS is in the discontinuous part or not is checked in step S501. If in the discontinuous part, the action shifts to step S502, wherein a stop-down compensation Quantity ΔAv is newly added to a stop Av. Subsequently, an apex operation is carried out in step S503. A necessary shutter time is computed.

An exposure in step S171 (see FIG. 16) may be conducted for the thus determined time.

Next, a third embodiment of the present invention will be described with reference to FIGS. 28 and 29.

Figure 28:
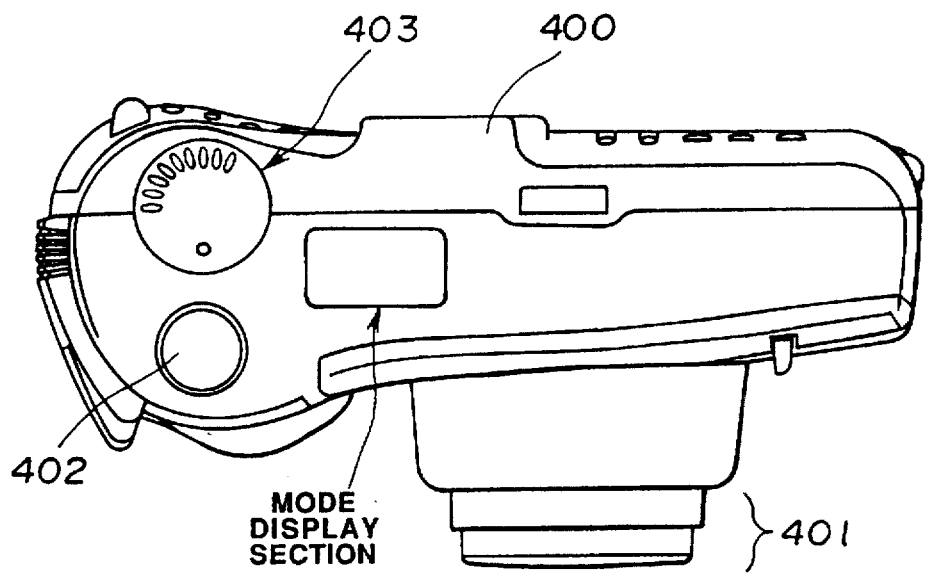
FIG. 28 is a top plan view showing one example of a camera which adopts the lens barrel according to the present invention.
Figure 29:
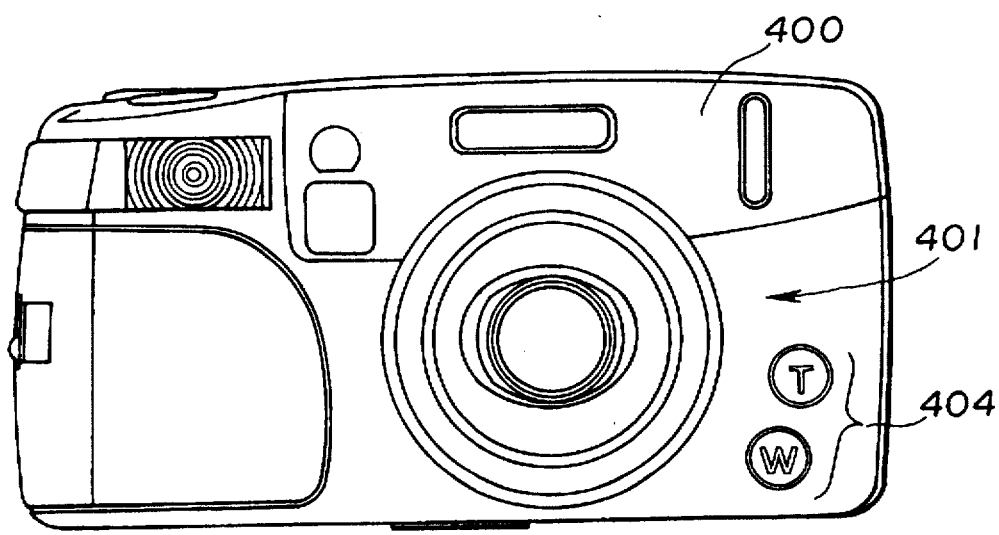
FIG. 29 is a front elevational view showing one example of the camera which adopts the lens barrel according to the present invention.

FIGS. 28 and 29 are top plan and front views each showing the camera which adopts the present invention. A difference of this embodiment from the first embodiment is stop control of the lens.

As shown in FIG. 28, an auto-zoom mode is selected by a mode select dial 403. Zooming is then effected so that the subject comes to have a given size in accordance with the focusing information. That is, when it is judged from the distance information that the subject is at a remote distance, a zoom lens 401 is driven towards the telephoto side. When it is judged that the subject is in a near distance, the zoom lens 401 is driven towards the wide-angle side. The photographer is thereby capable of automatically photographing the subject (generally, a portraiture) with a uniform size simply by depressing a release button 402 while setting the camera towards the subject.

Where a thus constructed camera 400 includes the same discontinuous part formed in the cam groove as that shown in the first embodiment, photographing is conducted in the following control method.

To begin with, zooming is performed to obtain a predetermined focal distance on the basis of the data on the relation between the subject distance and the focal distance that are stored in the memory element provided beforehand in the camera body.

At this time, if the predetermined focal distance is in the discontinuous part of the cam, the lens 401 is zoomed at a focal distance in the vicinity of the discontinuous part with a deviation therefrom.

Namely, in accordance with the third embodiment, the zoom lens 401 is driven and stopped. Thereafter, if the focal distance thereof is in the discontinuous part, and when it is judged that a focal distance for stopping not by effecting zoom driving but before zoom driving is in the discontinuous part, there is conducted zooming up to the position in the vicinity of the discontinuous part with a deviation therefrom.

Discontinuity in the zooming action can be thereby eliminated.

Further, the following control method is also practicable not only in the auto-zoom mode but in a normal manual zoom.

That is, as illustrated in FIG. 29, a judging means judges whether the current distance is in the discontinuous part or not when driving the zoom lens 401 by the photographer manipulating the zoom button 404. Where this judging means is provided, and when trying to stop the manipulation of the zoom button 404 in the discontinuous part by, for example, the photographer manually performing zoom driving, the zoom lens 401 is further driven in the zoom-driven direction thus far. Zoom driving is stopped when deviating from the discontinuous part.

The discontinuity in the zooming action can be obviated under such control in the same way as the auto-zoom.

In the case of the auto-zoom shown in the third embodiment discussed above, the number of pulses in the target stop position may be computed in the arithmetic flow S162.

Figure 30:
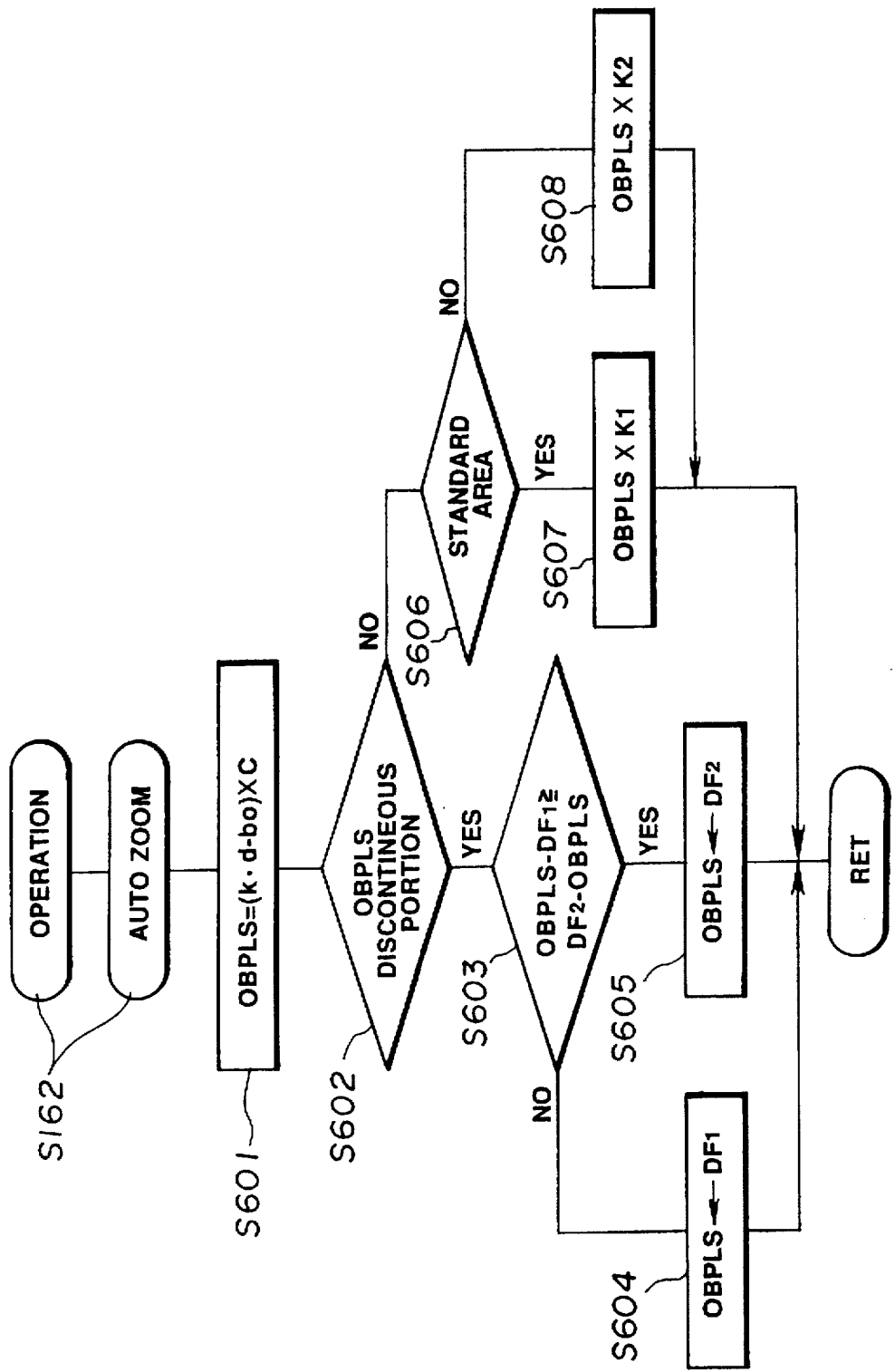
FIG. 30 is a flowchart showing an auto-zoom control operation in the lens barrel in a third embodiment of the present invention.

Namely, supposing that d is the output of the focusing AF-IC 105 in FIG. 12 as shown in a flow of FIG. 30, OBPLS can be computed in step S601 such as:

$$OBPLS = (k \cdot d - b_0) \times C$$

k is the auto-zoom coefficient having a value corresponding to the focal distance, this value being $1/35$ when, e.g., on the wide-angle side and $1/85$ when on the telephoto side. d is the subject distance. $b_0$ is the compensation value. and C is the proportional coefficient.

Steps S602 through S608 have already been described in FIG. 25 and may be omitted.

Figure 31:
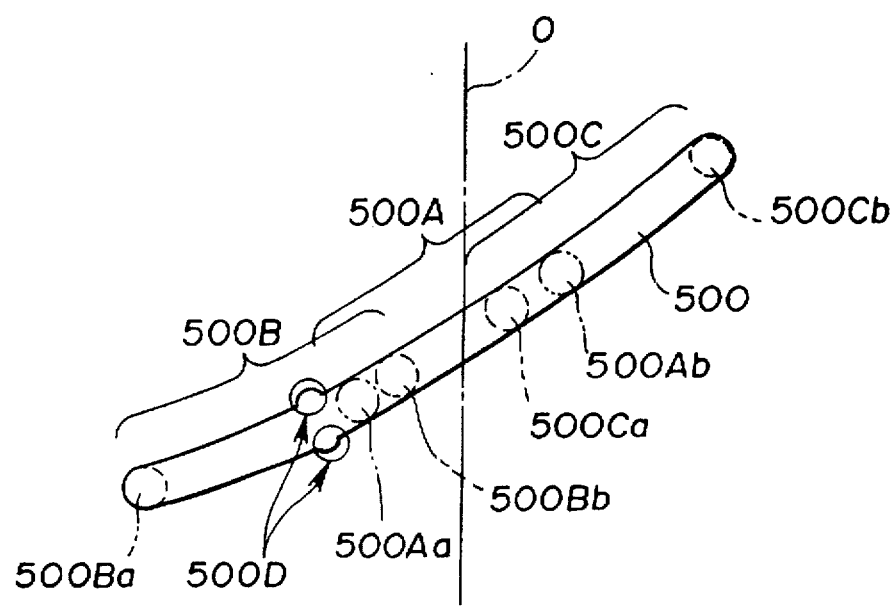
FIG. 31 is a plan view illustrating a configuration of the cam groove in the lens barrel in a fourth embodiment of the present invention.

FIG. 31 shows a cam slot 500 of assistance in explaining a fourth embodiment of the present invention.

In accordance with this embodiment, one cam slot is employed both for zooming and for focusing unlike the first to third embodiments.

The following is an explanation of an outline thereof. A left part of this cam slot 500 is a wide-angle area 500B of the focal distance. An infinity part 500Ba is provided at the left end of the wide-angle area 500B. A closest focusing part 500Bb in the wide-angle state is provided at the right end thereof. Further, a standard area 500A is provided at the center of this cam slot 500. A standard infinity part 500Aa is provided at the left end thereof. A standard closest focusing part 500Ab is provided at the right end thereof. Besides, a telephoto area 500C is formed in the right of the cam slot 500. A telephoto infinity part 500Ca is provided at the left end of the telephoto area 500C. A telephoto closest focusing part 500Cb is provided at the right end thereof.

As can be understood from the Figure, the respective focal distance areas overlap each other. Besides, as a matter of fact, the arrangement is not that there are only three states, i.e., the wide-angle, standard and telephoto states but that the focal distance continuously changes.

A discontinuous part 500D, as shown in the Figure, exists in the cam slot 500 described above. The camera incorporates a table of a focal distance and a subject distance of this part. When driving the lens, the lens does not halt in this area. With this arrangement, the present invention is also applicable to a lens barrel in which the single cam slot as shown in this embodiment can be shared for zooming and focusing.

Incidentally, when halting the lens drive shown in each embodiment, in the case of, e.g., zoom driving, the lens is returned to the telephoto side and stopped if the lens is going to halt in the discontinuous part during the shift from the telephoto side to the wide-angle side. If the lens is going to halt in the discontinuous part during the shift from the wide-angle side to the telephoto side, the lens is further driven to the telephoto side and stopped. With this operation, the backlash of the cam cylinder during the zooming process can be eliminated as much as possible.

This is, as a matter of course, applied to focalizing as well as to zooming.

Besides, each embodiment has dealt with only the lens drive of the lens barrel. The present invention is not, however, limited to this. The present invention is of course applied to any lens barrel having the discontinuous part formed in the cam. The same control can be, it is obvious, performed even when a parting line is formed in, e.g., a stop driving disc cam.

Although the illustrative embodiments of the present invention have been described in detail with reference to the accompanying drawings, it is to be understood that the present invention is not limited to those embodiments. Various changes or modifications may be effected by one skilled in the art without departing from the scope or spirit of the invention.

What is claimed is:

1. A lens barrel and control means therefor comprising:
   a cam slot having a discontinuous area;
   a frame member having a cam follower engaging said cam slot;
   a memory means for storing information indicating where said discontinuous area exists in said cam slot;
   a detecting means for detecting where said cam follower is positioned along said cam slot;
   a motor driving means for progressing and retreating a frame member in an optical-axis direction by driving said cam slot and said frame member relative to one another;
   a control means for controlling said motor driving means to shift said cam follower to a position deviating from said discontinuous area when said cam follower is in said discontinuous area by comparing memory information of said memory means with detection information of said detecting means and stopping said cam follower at a position deviating from said discontinuous part;
   data means for directing data photoing luminous flux toward an image plane;
   a taking lens optical system adjustable between a collapsed position for compact storage and a position for photographing;
   said optical system comprising at least two barrel members movable relative to one another, each provided with a flux passage opening;
   said openings being aligned when the optical system is in the photographing position to unblock data photoing flux and to permit said flux to reach said image plane and being offset when in the collapsed position to block data photoing flux from reaching said image plane.

2. A lens barrel and control means therefor comprising:
   an optical system;
   a stationary first cylinder having cam means;
   a second drive cylinder rotatable about said first cylinder and having elongated drive means;
   a third lens supporting cylinder arranged within and movable along an optical axis and having cam follower means slidable along said cam means and said drive means for moving said third cylinder along said optical axis responsive to rotation of said first cylinder;
   fourth and fifth cylinders arranged within said third cylinder and movable along said optical axis;
   said fourth and fifth cylinder each having cam follower means slidable along cam means provided in said third cylinder and elongated drive means in said first cylinder for moving said fourth and fifth cylinders along the optical axis responsive to movement of said third cylinder;
   at least one of said cam means comprising:
      a cam slot having a discontinuous area;
      at least one of said cam followers engaging said cam slot;
      a memory means for storing information indicating where said discontinuous area exists along said cam slot;
      a detecting means for detecting where said cam follower is positioned in said cam slot;
      a motor driving means for progressing and retreating a frame member in an optical-axis direction by driving said cam slot and said frame member relative to one another; and
      a control means for controlling said motor driving means to shift said cam follower to stop at a position displaced from said discontinuous area when said cam follower is in said discontinuous area by comparing memory information of said memory means with detection information of said detecting means.

3. A lens barrel and control means therefor comprising:
   a cam slot having a discontinuous area which can reduce an optical quality of the lens barrel;
   a frame member having a cam follower engaging said cam slot;
   a memory means for storing information indicating where said discontinuous area exists along said cam slot;
   a detecting means for detecting where said cam follower is positioned along said cam slot;
   a motor driving means for progressing and retreating a frame member in an optical-axis direction by driving said cam slot and said frame member relative to one another; and
   a control means for controlling said motor driving means to shift said cam follower to stop at a position displaced from said discontinuous area only when said cam follower is in said discontinuous area, by comparing memory information of said memory means with detection information of said detecting means.

4. The lens barrel and control means therefor according to claim 3, wherein said cam slot is formed in a fixed frame.

5. The lens barrel and control means therefor according to claim 3, wherein said frame member is a frame for holding a lens group.

6. The lens barrel and control means therefor according to claim 3, wherein said discontinuous area is provided substantially at a center of a length of said cam slot.

7. A lens barrel according to claim 3 wherein said control means further comprises means for shifting a play of the frame member in a given direction to compensate for a backlash.

8. A lens barrel and control means according to claim 3 further comprising at least one lens driven by said cam follower and having an adjustable aperture stop; and means for reducing the aperture stop responsive to a displacement of the said cam follower to compensate for an out of focus condition of the lens due to said cam follower displacement.

9. A lens barrel and control means according to claim 3 wherein said control means includes means to stop said cam follower at the displaced position before reaching the discontinuous area.

10. A lens barrel and control means according to claim 3 wherein said control means includes said cam follower so that the cam follower is located on a telephoto side of said discontinuous area.

11. A lens barrel and control means according to claim 3 wherein said cam slot has a macro photography portion and a normal photography portion, said discontinuous area being positioned between a closest focusing end of said normal photography portion and said macro photography portion.

12. A lens barrel and control means therefor comprising:

a cam slot having a discontinuous area which can reduce an optical quality of the lens barrel;

a frame member having a cam follower slidably engaging said cam slot;

a detecting means for detecting a position of said cam follower along said cam slot;

a motor driving means for driving said cam slot and said cam follower relative to one another; and a control means for controlling said motor driving means so that said cam follower is stopped at a position displaced from said discontinuous area on the basis of an output of said detecting means.

13. The lens barrel and control means therefor according to claim 12, wherein said frame member is a frame for holding a lens group.

14. A lens barrel and control means therefor comprising:

a cam slot having a discontinuous area which can reduce an optical quality of the lens barrel;

a frame member having a cam follower slidable engaging said cam slot;

a detecting means for detecting a position of said cam follower along said cam slot;

a motor driving means for driving said cam slot and said cam follower relative to one another; and a control means for controlling said motor driving means so that said cam follower is stopped at a position displaced from said discontinuous area on the basis of an output of said detecting means; and said cam slot being formed in a fixed frame.

15. A lens barrel and control means therefor comprising:

a cam slot having a discontinuous area which can reduce an optical quality of the lens barrel;

a cam follower slidably engaging said cam slot;

a detecting means for detecting a position of said cam follower along said cam slot;

a motor driving means for driving said cam slot relative to said cam follower; and a control means for controlling said motor driving means to prevent said cam follower from stopping in said discontinuous area on the basis of an output of said detecting means by moving the cam follower to a position displaced from the discontinuous area.

16. The lens barrel and control means therefor according to claim 15, wherein said cam slot is formed in a fixed frame.

17. The lens barrel and control means therefor according to claim 15, wherein said cam follower is provided in a frame for holding a lens group.

18. A lens barrel and control means therefor comprising:

a first frame provided with a cam slot having a discontinuous area which can reduce an optical quality of the lens barrel;

a second frame including a cam follower slidably engaging said cam slot;

a memory means for storing information indicating a location of said discontinuous area along said cam slot;

a detecting means for detecting a position of said cam follower along said cam slot;

a motor driving means for progressing and retreating said second frame in an optical-axis direction by driving said first and second frames relative to one another; and a control means for controlling said motor driving means so that said cam follower is stopped at a position displaced from said discontinuous area when said cam follower is in said discontinuous area by comparing memory information of said memory means with detection information of said detecting means.

19. The lens barrel and control means therefor according to claim 18, wherein said first frame is a fixed frame.

20. The lens barrel and control means therefor according to claim 18, wherein said second frame is a frame for holding a lens group.

21. The lens barrel and control means therefor according to claim 18, wherein said discontinuous area is provided substantially at a center of a length of said cam slot.

22. A lens barrel and control means therefor comprising:

a cam slot having a discontinuous area;

a cam follower slidably engaging said cam slot; and a motor driving means for effecting a drive so that said cam follower is stopped at a position displaced from said discontinuous area when said cam follower is in said discontinuous area.

23. The lens barrel and control means therefor according to claim 22, further comprising a detecting means for detecting a position of said cam follower in said cam slot.

24. A lens barrel and control means therefor comprising:

a cam slot having a discontinuous area;

a cam follower slidably engaging said cam slot;

a motor driving means for effecting a drive so that said cam follower is stopped at a position displaced from said discontinuous area when said cam follower is in said discontinuous area;

a detecting means for detecting a position of said cam follower in said cam slot; and a memory means for storing data representing a position of said discontinuous area along said cam slot.

25. The lens barrel and control means therefor according to claim 24, further comprising a control means for controlling the motor driving means by comparing an output of said detecting means with an output of said memory means.

26. A lens barrel and control means therefor comprising:

a cam slot having a discontinuous area which can reduce an optical quality of the lens barrel;

a lens cylinder having a cam follower slidably engaging said cam slot;

a memory means for storing information indicating a location of said discontinuous area in said cam slot;

a position detecting means for detecting a location of said cam follower of said lens cylinder along said cam slot;

a motor driving means for progressing and retreating said lens cylinder in an optical-axis direction by driving one of said cam slot and said lens cylinder with respect to the other; and a control means for stopping said lens cylinder at a position displaced from said discontinuous area when said cam follower of said lens cylinder is in said discontinuous area of said cam slot by comparing memory information of said memory means with detection information of said position detecting means.

27. A lens barrel and control means therefor comprising:

a cam slot for a zooming operation, said cam slot having a discontinuous area;

a lens cylinder having a cam follower slidably engaging said cam slot;

a memory means for storing information indicating a focal distance value at which said discontinuous area exists;

a position detecting means for detecting a focal distance of said cam follower of said lens cylinder along said cam slot;

a motor driving means for progressing and retreating said lens cylinder in an optical-axis direction by driving one of said cam slot and said lens cylinder with respect to the other; and a control means for stopping said lens cylinder at a position displaced from said discontinuous area where said cam follower of said lens cylinder is in said discontinuous area of said cam slot by comparing memory information of said memory means with detection information of said position detecting means.

28. A lens barrel and control means therefor according to claim 27 further including means for moving the lens cylinder to bring an image into focus.

29. A lens barrel and control means therefor comprising:

a cam slot having a discontinuous area and shared for zooming and focusing operations;

a lens cylinder having a cam follower slidably engaging said cam slot;

a memory means for storing information indicating one of a focal distance and a position corresponding to a subject where said discontinuous area exists;

a position detecting means for detecting one of a focal distance and a position corresponding to said subject said cam follower of said lens cylinder occupies in said cam slot;

a motor driving means for progressing and retreating said lens cylinder in the optical-axis direction by driving one of said cam slot and said lens cylinder with respect to the other; and a control means for stopping said lens cylinder at a position displaced from said discontinuous area when said cam follower of said lens cylinder is in said discontinuous area of said cam slot by comparing memory information of said memory means with detection information of said detecting means.

30. A lens barrel and control means therefor according to claim 29 further including means for moving the lens cylinder to bring an image into focus.

31. A lens barrel and control means therefor comprising:

a cam slot for a zooming operation, said cam slot having a discontinuous area;

a lens cylinder having a cam follower slidably engaging said cam slot;

a memory means for storing information indicating a focal distance position said discontinuous area occupies;

a position detecting means for detecting which focal distance position said cam follower of said lens cylinder occupies in said cam slot;

a motor driving means for progressing and retreating said lens cylinder in an optical-axis direction by driving one of said cam slot and said lens cylinder with respect to the other;

a motor drive actuating means for use by a photographer for manually driving said motor driving means; and a control means for controlling said motor driving means, whereby said control means drives said lens cylinder, when said cam follower of said lens cylinder is in said discontinuous area of said cam slot, further in a given direction by shifting a focal distance from one state to another state and stopping said cam follower through said motor drive actuating means and thereafter comparing memory information of said memory means with detection information of said position detecting means.

32. A lens barrel and control means therefor comprising:

a cam slot for a zooming operation, said cam slot having a discontinuous area;

a lens cylinder having a cam follower slidably engaging said cam slot;

a memory means for storing information indicating which focal distance value said discontinuous area occupies;

a position detecting means for detecting which focal distance value said cam follower of said lens cylinder occupies in said cam slot;

a motor driving means for progressing and retreating said lens cylinder in the optical-axis direction by driving one of said cam slot and said lens cylinder with respect to the other;

a motor drive actuating means for a photographer manually driving said motor driving means; and a control means for controlling said motor driving means, whereby said control means drives said lens cylinder to a normal photographing state displaced from said discontinuous area when said cam follower of said lens cylinder is in said discontinuous area of said cam slot by altering a zooming operation from a collapsing state to a normal photographing state and stopping said cam follower through said motor drive actuating means and comparing memory information of said memory means with detection information of said position detecting means, and said control means drives said lens cylinder to the normal photographing state displaced from said discontinuous area when said cam follower of said lens cylinder is in said discontinuous area of said cam slot by altering the zooming operation from the normal photographing state to the collapsing state and stopping the cam follower through said motor drive actuating means and comparing the memory information of said memory means with the detection information of said position detecting means.

33. A lens barrel and control means therefor comprising:

a cam slot, having a discontinuous area, for a focusing operation;

a lens cylinder having a cam follower engaging said cam slot;

a memory means for storing information indicating a focal distance associated with said discontinuous area;

a position detecting means for detecting a focal position said cam follower occupies along said cam slot;

a motor driving means for progressing and retreating said lens cylinder in the optical-axis direction by driving one of said cam slot and said lens cylinder with respect to the other;

a motor drive actuating means for a photographer manually driving said motor driving means; and a control means for controlling said motor driving means, whereby said control means drives said lens cylinder, when said cam follower of said lens cylinder is in said discontinuous area of said cam slot, further to a given state by altering the focal position from one state to the given state and stopping said cam follower through said motor drive actuating means and thereafter comparing memory information of said memory means with detection information of said position detecting means.

34. The lens barrel and control means therefor according to claim 33, wherein said discontinuous area is provided between a macro photographing area and a normal photographing area of said cam slot.

35. A lens barrel and control means therefor comprising:

a cam slot;

a lens cylinder having a cam follower engaging the cam slot;

a memory means for storing location data representing a discontinuous part of said cam slot engaging said cam follower;

a detecting means for detecting a position of said cam follower in said cam slot;

a driving means for relatively driving said cam slot and said cam follower; and an inhibiting means for inhibiting said cam follower from stopping in said discontinuous part by stopping said cam follower at a position displaced from said discontinuous part when detecting that said cam follower is in said discontinuous part of said cam slot by comparing an output of said memory means with an output of said detecting means.

36. A lens barrel and control means therefor comprising:

a cam slot;

a lens cylinder having a cam follower engaging said cam slot;

a memory means for storing information representing a location of a discontinuous part of said cam slot engaged by said cam follower;

a detecting means for detecting a position of said cam follower along said cam slot;

a driving means for driving one of said cam slot and said cam follower relative to the other; and a control means operating the driving means for stopping said cam follower at a position displaced from said discontinuous part when detecting that said cam follower is in said discontinuous part of said cam slot by comparing an output of said memory means with an output of said detecting means.

37. A driving mechanism comprising:

a cam slot;

a cam follower engaging said cam slot;

a memory means for storing information relating to a location of a discontinuous part of said cam slot engaged by said cam follower;

a detecting means for detecting a position of said cam follower along said cam slot;

a driving means for driving one of said cam slot and said cam follower relative to the other; and an inhibiting means for inhibiting said cam follower from stopping at said discontinuous part when detecting that said cam follower is in said discontinuous part of said cam slot by comparing an output of said memory means with an output of said detecting means and stopping said cam follower at a position displaced from said discontinuous part.

38. A lens barrel and control means therefor comprising:

a cam slot having a discontinuous area;

a lens housing having a cam follower slidably engaging said cam slot;

a position detecting means for detecting a position said cam follower of said lens housing occupies along said cam slot;

a motor driving means for progressing and retreating said lens barrel in an optical-axis direction by driving one of said cam slot and said lens housing with respect to the other; and a control means for stopping said cam follower at a position displaced from said discontinuous area in a given direction when said position detecting means detects that said cam follower is in said discontinuous area of said cam slot after said motor driving means has driven said lens barrel.

39. A lens barrel and control means therefor comprising:

a cam slot having a discontinuous area;

a lens housing having a cam follower slidably engaging said cam slot;

a position detecting means for detecting a position said cam follower of said lens housing occupies along said cam slot;

a motor driving means for progressing and retreating said lens housing in an optical-axis direction by driving one of said cam slot and said lens housing with respect to the other;

an arithmetic means for computing a target stop position of said cam follower;

a compensating means for compensating an arithmetic operation of said arithmetic means so that said target stop position is displaced from said discontinuous area when said target stop position is in said discontinuous area; and a control means for controlling said motor driving means on the basis of an output of said arithmetic means.

40. A lens barrel and control means therefor comprising:

a cam slot having a discontinuous area;

a lens housing having a cam follower slidably engaging said cam slot;

a position detecting means for detecting a position which said cam follower of said lens housing occupies along said cam slot;

a motor driving means for progressing and retreating said lens housing in an optical-axis direction by driving one of said cam slot and said lens housing with respect to the other;

a distance detecting means for detecting a distance of a subject;

an arithmetic means for computing a target stop position of said cam follower on a basis of a result of detecting the subject distance;

a compensating means for compensating an arithmetic operation of said arithmetic means so that said target stop position is displaced from said discontinuous area when said target stop position is in said discontinuous area; and a control means for controlling said motor driving means on the basis of an output of said arithmetic means.

41. A lens barrel and control means therefor comprising:

a cam slot having a discontinuous area which can reduce an optical quality of the lens barrel:

a frame member having a cam follower slidably engaging said cam slot;

a detecting means for detecting a position of said cam follower along said cam slot;

a motor driving means for driving said cam slot and said cam follower relative to one another; and a control means for controlling said motor driving means so that said cam follower is stopped at a position displaced from said discontinuous area on the basis of an output of said detecting means; and said control means further comprising means for shifting a play of the frame member in a given direction to compensate for a backlash.

42. A lens barrel and control means therefor comprising:

a cam slot having a discontinuous area which can reduce an optical quality of the lens barrel;

a cam follower slidably engaging said cam slot;

a detecting means for detecting a position of said cam follower along said cam slot;

a motor driving means for driving said cam slot relative to said cam follower;

a control means for controlling said motor driving means to prevent said cam follower from stopping in said discontinuous area on the basis of an output of said detecting means by moving the cam follower to a position displaced from the discontinuous area; and said control means further comprising means for shifting a play of the frame member in a given direction to compensate for a backlash.

43. A lens barrel and control means therefor comprising:

a cam slot having a discontinuous area;

a cam follower slidable engaging said cam slot;

a motor driving means for effecting a drive so that said cam follower is stopped at a position displaced from said discontinuous area when said cam follower is in said discontinuous area; and said motor driving means including means to stop the cam follower before it reaches the discontinuous area.

44. A lens barrel and control means therefor according to claim 43 wherein said motor driving means includes means to stop the cam follower on a telephoto side of the discontinuous area.

45. A lens barrel and control means therefor comprising:

a cam slot having a discontinuous area provided during manufacture thereof;

a frame member supporting at least one lens and having a cam follower engaging said cam slot;

said cam slot having lens accommodating portion and a photographing portion;

a detecting means for detecting where said cam follower is positioned along said cam slot;

a motor driving means for progressing and retreating said frame member in an optical-axis direction by driving said cam slot and said frame member relative to one another; and a control means for controlling said motor driving means to shift said cam follower to said lens accommodating portion to collapse the lens barrel when not in use and to said photographing portion extending the lens for a photographing operation;

said discontinuous area being arranged outside of said photographing region to prevent the discontinuous area from affecting an image during photographing.

46. A lens barrel and control means according to claim 45 wherein said cam slot has first and second ends;

said accommodating portion being located at said first end of said cam slot;

said photographing portion extending between an infinity focusing end and said closest focusing end;

said closest focusing end being adjacent to the first end of the cam slot;

said discontinuous area lying between said closest focusing end and said accommodating portion.

* * * * *

UNITED STATES PATENT AND TRADEMARK OFFICE
CERTIFICATE OF CORRECTION

PATENT NO. : 5,758,205
DATED : MAY 26, 1998
INVENTOR(S) : HARA ET AL

It is certified that error appears in the above-identified patent and that said Letters Patent is hereby corrected as shown below:

On the title page
In item [57] (Abstract), line 5, delete "ass" and insert --as--.

Col. 1, line 43, delete "for" and insert --as a result of--.

Col. 11, line 40, delete "mpves" and insert --moves--.

Col. 13, line 38, delete "to" after "assumes".

Col. 13, line 52, delete "118a" and insert --118b--.

Col. 13, line 65, after "switch" insert --which--.

Col. 13, line 66, after "i.e.," insert --with--

Figure 8:
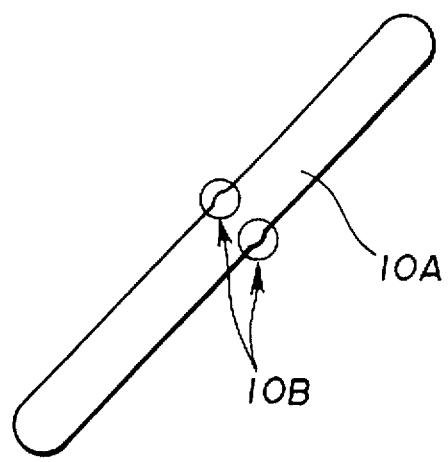
FIG. 8 is a plan view illustrating a cam slot in which run-offs are formed in a part of a parting line.

Col. 13, line 67, after "FIG. 8" insert --may take place--.

Signed and Sealed this

Fourth Day of April, 2000

Q. TODD DICKINSON

*Attest:*

*Attesting Officer*          *Director of Patents and Trademarks*